US012754131B2

(12) United States Patent
Sohan

(10) Patent No.: US 12,754,131 B2
(45) Date of Patent: Oct. 6, 2026

(54) RAMAN SPECTROSCOPY METHOD AND APPARATUS

(71) Applicant: The University Court of the University of Edinburgh, Edinburgh (GB)

(72) Inventor: Seth Sohan, Edinburgh (GB)

(73) Assignee: THE UNIVERSITY COURT OF THE UNIVERSITY OF EDINBURGH, Edinburgh (GB)

( * ) Notice: Subject to any disclaimer, the term of this patent is extended or adjusted under 35 U.S.C. 154(b) by 20 days.

(21) Appl. No.: 18/709,012

(22) PCT Filed: Nov. 10, 2022

(86) PCT No.: PCT/GB2022/052846
§ 371 (c)(1),
(2) Date: May 9, 2024

(87) PCT Pub. No.: WO2023/084216
PCT Pub. Date: May 19, 2023

(65) Prior Publication Data

US 2025/0003868 A1 Jan. 2, 2025

(30) Foreign Application Priority Data

Nov. 10, 2021 (GB) ...................................... 2116167

(51) Int. Cl.
*G01J 3/44* (2006.01)
*G01J 3/10* (2006.01)
(Continued)

(52) U.S. Cl.
CPC .............. *G01N 21/274* (2013.01); *G01J 3/10* (2013.01); *G01J 3/44* (2013.01); *G01N 21/65* (2013.01); *G01J 2003/4424* (2013.01)

(58) Field of Classification Search
CPC ......... G01N 21/274; G01N 21/65; G01J 3/10; G01J 3/44; G01J 2003/4424; G01J 3/0218; G01J 3/0286
See application file for complete search history.

(56) References Cited

U.S. PATENT DOCUMENTS 5,617,205 A * 4/1997 Dou .......................... G01J 3/44 356/318
8,570,507 B1 10/2013 Cooper et al.
(Continued)

FOREIGN PATENT DOCUMENTS

EP 0751382 A2 * 1/1997 ................ G01J 3/44

OTHER PUBLICATIONS

Hai Liu et al: "Spectral Deconvolution and Feature Extraction With Robust Adaptive Tikhonov Regularization", IEEE Transactions on Instrumentation and Measurement, IEEE, USA, vol. 62, No. 2, Feb. 1, 2013 (Feb. 1, 2013), pp. 315-327.
(Continued)

*Primary Examiner* — Abdullahi Nur
(74) *Attorney, Agent, or Firm* — Foley & Lardner LLP

(57) ABSTRACT

A method of performing Raman spectroscopy comprising: generating wavelength shifted excitation light for exciting a Raman response from at least one sample, wherein the wavelength shifted excitation light comprises at least two excitation wavelengths; providing the wavelength shifted excitation light to the at least one sample and collecting signal light from the at least one sample; obtaining response signals from the collected signal light; processing the obtained response signals to determine a Raman response and a fluorescence response, wherein determining the Raman response uses at least one characteristic of an expected Raman response to the wavelength shifted excitation light and wherein determining the fluorescence response
(Continued)

uses at least one characteristic of an expected fluorescence response to the shifted excitation light.

19 Claims, 7 Drawing Sheets

(51) Int. Cl.
*G01N 21/27* (2006.01)
*G01N 21/65* (2006.01)

(56) References Cited

U.S. PATENT DOCUMENTS

| | | | | |
|---|---|---|---|---|
| 10,458,917 | B2 * | 10/2019 | Carron | G01N 21/65 |
| 11,193,827 | B2 * | 12/2021 | Kersey | G01N 21/65 |
| 2002/0156380 | A1 * | 10/2002 | Feld | A61B 5/0086 250/341.8 |
| 2009/0021724 | A1 * | 1/2009 | Mahadevan-Jansen | G01N 21/65 356/73 |
| 2009/0131802 | A1 * | 5/2009 | Fulghum | A61B 5/6843 600/478 |
| 2018/0195965 | A1 * | 7/2018 | Carron | G01N 21/65 |
| 2021/0025758 | A1 | 1/2021 | Katz | |
| 2021/0310868 | A1 | 10/2021 | Root et al. | |

OTHER PUBLICATIONS

PCT/GB2022/052846 International Search Report, Dec. 19, 2022.

* cited by examiner

| | CYCLOHEXANE | | | | | | | SESAME OIL | | | | | | | HEALTHY TISSUE | | | | | | |
|---|---|---|---|---|---|---|---|---|---|---|---|---|---|---|---|---|---|---|---|---|---|
| K | SNR↑ | Corr.↓ | Spar. | # P. | Prec.↑ | Rec.↑ | Time↓ [Itr] | SNR↑ | Corr.↓ | Spar. | # P. | Prec.↑ | Rec.↑ | Time↓ [Itr] | SNR↑ | Corr.↓ | Spar. | # P. | Prec.↑ | Rec.↑ | Time↓ [Itr] |
| 2 | 72.1 | 0.291 | 0.301 | 57 | 0.088 | 1.0 | 378 [100] | 34.0 | 0.388 | 0.371 | 113 | 0.053 | 1.000 | 361 [100] | 23.6 | 0.344 | 0.353 | 128 | 0.039 | 0.833 | 37 [8] |
| 4 | 80.3 | 0.312 | 0.309 | 15 | 0.333 | 1.0 | 51 [12] | 74.9 | 0.480 | 0.321 | 31 | 0.194 | 1.000 | 233 [63] | 55.4 | 0.354 | 0.646 | 23 | 0.130 | 0.500 | 39 [9] |
| 6 | 107.9 | 0.306 | 0.341 | 7 | 0.714 | 1.0 | 46 [11] | 103.8 | 0.467 | 0.408 | 18 | 0.333 | 1.000 | 250 [69] | 88.2 | 0.237 | 0.587 | 22 | 0.182 | 0.667 | 109 [29] |
| 8 | 99.8 | 0.319 | 0.348 | 7 | 0.714 | 1.0 | 48 [11] | 92.7 | 0.448 | 0.453 | 8 | 0.750 | 1.000 | 193 [50] | 149.7 | 0.257 | 0.682 | 9 | 0.444 | 0.667 | 63 [16] |
| 10 | 120.9 | 0.338 | 0.382 | 6 | 0.833 | 1.0 | 47 [11] | 135.9 | 0.452 | 0.497 | 8 | 0.750 | 1.000 | 269 [73] | 198.9 | 0.264 | 0.677 | 8 | 0.500 | 0.667 | 92 [23] |

| | | Peak Location ± Width/2 ($cm^{-1}$) | | | | | | SNR[†] | Corr.[*] | Spac. | # P. | Prec.[†] | Rec.[†] | Time[‡] |
|---|---|---|---|---|---|---|---|---|---|---|---|---|---|---|
| CYCLOHEXANE | True | 1029 ± unk | 1158 ± unk | 1267 ± unk | 1347 ± unk | 1445 ± unk | | | | | | | | |
| | AIRPLS | 1028 ± 36 | 1159 ± 33 | 1270 ± 34 | 1343 ± 21 | 1442 ± 42 | | 24.8 | 0.153 | 0.009 | 156 | 0.032 | 1.000 | 0.091 |
| | RSERDS | 1030 ± 33 | 1157 ± 53 | 1267 ± 30 | 1345 ± 28 | 1445 ± 40 | | 38.1 | | 0.072 | 7 | 0.714 | 1.000 | 0.347 |
| | PCA | 1031 ± 75 | 1159 ± 28 | 1270 ± 55 | 1350 ± 26 | 1446 ± 60 | | | | 0.025 | 282 | 0.018 | 1.000 | 0.001 |
| | PIP | 1030 ± 44 | 1159 ± 18 | 1268 ± 36 | 1349 ± 20 | 1445 ± 40 | | 192.3 | 0.356 | 0.059 | 6 | 0.833 | 1.000 | 1.899 |
| | SNMF | 1030 ± 36 | 1159 ± 19 | 1268 ± 40 | 1349 ± 20 | 1445 ± 40 | | 152.3 | 0.556 | 0.010 | 6 | 0.833 | 1.000 | 15.693 |
| | SICA | 1029 ± 32 | 1159 ± 17 | 1268 ± 29 | 1350 ± 20 | 1445 ± 43 | | 38.3 | 0.300 | 0.006 | 45 | 0.111 | 1.000 | 42.964 |
| | MSERS | 1030 ± 28 | 1159 ± 17 | 1268 ± 35 | 1350 ± 11 | 1445 ± 37 | | 120.9 | 0.338 | 0.382 | 6 | 0.833 | 1.000 | 47.390 |
| SESAME OIL | True | 1083 ± unk | 1267 ± unk | 1304 ± unk | 1441 ± unk | 1657 ± unk | 1747 ± unk | | | | | | | |
| | AIRPLS | 1078 ± 15 | 1270 ± 15 | 1300 ± 47 | 1435 ± 24 | 1660 ± 18 | 1750 ± 3 | 12.6 | 0.239 | 0.011 | 183 | 0.033 | 1.000 | 0.012 |
| | RSERDS | 1076 ± 45 | 1271 ± 19 | 1302 ± 29 | 1441 ± 36 | 1655 ± 34 | 1755 ± 36 | 42.6 | | 0.035 | 17 | 0.353 | 1.000 | 0.233 |
| | PCA | i/d | i/d | i/d | i/d | i/d | i/d | | | 0.000 | 0 | | 0.000 | 0.003 |
| | PIP | 1075 ± 79 | 1273 ± 15 | 1304 ± 58 | 1442 ± 47 | 1659 ± 34 | 1748 ± 28 | 51.8 | 0.854 | 0.017 | 9 | 0.667 | 1.000 | 1.925 |
| | SNMF | 1075 ± 54 | 1270 ± 10 | 1302 ± 72 | 1442 ± 33 | 1659 ± 12 | 1748 ± 20 | 59 | 0.855 | 0.000 | 14 | 0.429 | 1.000 | 18.479 |
| | SICA | 1075 ± 26 | i/d | 1304 ± 41 | 1442 ± 36 | 1659 ± 17 | 1748 ± 23 | 27 | 0.316 | 0.000 | 6 | 0.833 | 0.833 | 47.090 |
| | MSERS | 1075 ± 22 | 1270 ± 15 | 1304 ± 42 | 1442 ± 38 | 1659 ± 19 | 1748 ± 20 | 135.9 | 0.452 | 0.497 | 8 | 0.750 | 1.000 | 269.300 |
| HEALTHY TISSUE | True | 1078 ± unk | 1265 ± unk | 1302 ± unk | 1445 ± unk | 1665 ± unk | 1745 ± unk | | | | | | | |
| | AIRPLS | 1079 ± 4 | 1263 ± 2 | 1304 ± 10 | 1447 ± 38 | 1668 ± 14 | 1750 ± 8 | 9.7 | 0.150 | 0.020 | 242 | 0.025 | 1.000 | 0.014 |
| | RSERDS | 1069 ± 26 | i/d | 1296 ± 46 | 1451 ± 39 | i/d | 1741 ± 52 | 49.1 | | 0.094 | 21 | 0.190 | 0.667 | 0.271 |
| | PCA | i/d | i/d | i/d | i/d | i/d | i/d | | | 0.000 | 0 | | 0.000 | 0.002 |
| | PIP | i/d | i/d | 1316 ± 47 | 1455 ± 36 | i/d | 1733 ± 28 | 33.0 | 0.255 | 0.045 | 10 | 0.300 | 0.500 | 1.899 |
| | SNMF | i/d | i/d | 1295 ± 45 | 1454 ± 39 | i/d | 1733 ± 36 | 38.8 | 0.520 | 0.006 | 5 | 0.600 | 0.500 | 16.440 |
| | SICA | i/d | i/d | 1291 ± 45 | 1446 ± 37 | i/d | 1729 ± 51 | 45.9 | -0.048 | 0.017 | 7 | 0.429 | 0.500 | 48.495 |
| | MSERS | 1087 ± 10 | i/d | 1302 ± 44 | 1449 ± 36 | i/d | 1733 ± 12 | 198.9 | 0.264 | 0.677 | 8 | 0.500 | 0.667 | 91.562 |

Figure 6

| | SESAME OIL | | | | | | |
|---|---|---|---|---|---|---|---|
| $K \times t$ | SNR↑ | Corr.↓ | Spar. | # P. | Prec.↑ | Rec.↑ | Time↓ [Itr] |
| 2 ×20 s | 22.3 | 0.546 | 0.361 | 16 | 0.375 | 0.750 | 279 [100] |
| 4 ×10 s | 78.2 | 0.352 | 0.449 | 12 | 0.583 | 0.875 | 277 [100] |
| 8 ×5 s | 75.3 | 0.279 | 0.538 | 10 | 0.700 | 0.875 | 171 [66] |

RAMAN SPECTROSCOPY METHOD AND APPARATUS

CROSS-REFERENCE TO RELATED APPLICATIONS

This application is a National Stage Application under 35 U.S.C. § 371 of PCT/GB2022/052846, filed Nov. 10, 2022, which claims priority to Great Britain Patent Application No. 2116167.4, filed Nov. 10, 2021, which are hereby incorporated by reference in their entireties.

FIELD

The present invention relates to a method and apparatus for performing Raman spectroscopy.

BACKGROUND

Raman spectroscopy investigates the scattering of light from a sample by exciting the sample with monochromatic light at an excitation wavelength and recording the corresponding emission spectrum. In the absence of fluorescence, a Raman response spectrum is usually characterised by sharp intermittent peaks (which may overlap) over a zero baseline. The sample, however, typically also produces a fluorescence spectrum which creates a relatively smooth but non-zero baseline. The fluorescence background may dominate the Raman response to excitation by light, for example, for in vivo applications, the Raman response may be masked by the auto fluorescence of the surrounding tissue.

There are a number of known approaches to suppress the fluorescence signal, however, such approaches may have limitations.

Known methods may recover Raman spectrum from Shifted excitation Raman spectroscopy (SER) by solving a Poisson Inverse Problem (PIP). These methods have been proposed, for example, by S. T. McCain et al. (in “Multi-excitation raman spectroscopy technique for fluorescence rejection,” *Opt. Express*, vol. 16, no. 15, 2008) and J. B. Cooper et al. (in “Sequentially shifted excitation raman spectroscopy: Novel algorithm and instrumentation for fluorescence-free raman spectroscopy in spectral space,” Appl. Spectrosc., vol. 67, no. 8, 2013) and S. Marshall et al. (in “Quantitative raman spectroscopy when the signal-to-noise is below the limit of quantitation due to fluorescence interference: Advantages of a moving window sequentially shifted excitation approach,” *Appl. Spectrosc*., vol. 70, no. 9, 2016)

Other known methods use general purpose algorithms, i.e., Shifted Nonnegative Matrix Factorization (SNMF) and Shifted Nonnegative Independent Component Analysis (SICA), to separate multiple spectra with unknown shifts. These methods have been proposed, for example, by Morup et al. in “Shifted non-negative matrix factorization,” in IEEE Mach. Learn. Signal Process., 2007, pp. 139-144. and Morup et. al. in “Shifted independent component analysis,” English, in Indep. Component Anal. and Signal Sep., 2007, pp. 89-96”. However, these known methods may suffer from a number of disadvantages and/or drawbacks.

SUMMARY

In accordance with a first aspect, there is provided a method of performing Raman spectroscopy comprising: generating wavelength shifted excitation light for exciting a Raman response from at least one sample, wherein the wavelength shifted excitation light comprises at least two excitation wavelengths; providing the wavelength shifted excitation light to the at least one sample and collecting signal light from the at least one sample; obtaining response signals from the collected signal light; processing the obtained response signals to determine a Raman response and a fluorescence response, wherein determining the Raman response uses at least one characteristic of an expected Raman response to the wavelength shifted excitation light and wherein determining the fluorescence response uses at least one characteristic of an expected fluorescence response to the shifted excitation light. The at least one sample may comprise a single sample. The at least one sample may comprise two or more samples.

The at least one characteristic of the expected Raman response may comprise a sparseness of the expected Raman response. The at least one characteristic of the expected fluorescence response may comprise a smoothness of the expected fluorescence response.

The at least one characteristic of the expected Raman response may comprise a substantial portion of the Raman response having a measure of size, amplitude and/or intensity lower than a pre-determined threshold.

The substantial portion may be at least half or at least three quarters of the Raman response over an excitation wavelength range covering the wavelengths of the generated emission light. The substantial portion may be a percentage of the Raman response signal wavelength range. The percentage may be in the range between 30% to 70%, optionally in the range 20% to 80%, further optionally in the range 10% to 90%.

The threshold value may be based on a maximum measured intensity and/or amplitude and/or size of one of the response signals. The threshold may be a percentage of the maximum measured intensity or amplitude. The maximum measured intensity or amplitude may comprise the maximum value of intensity or amplitude of the response signals. The threshold may be in the range 0 to 1% or 0 to 0.5% or 0 to 0.1% of a maximum intensity or amplitude. The pre-determined threshold may be 0.1% of a maximum intensity or amplitude.

The at least one characteristic of the expected Raman response may comprise a response having a set of known peaks. The at least one characteristic of the expected Raman response may comprise a set of well-defined and/or separated peaks.

The at least one characteristic of the expected fluorescence response comprises a change less than a pre-determined value over a neighbourhood of a wavelength. The neighbourhood may be pre-defined. The change over the neighbourhood may comprise a change in a measured value, for example, intensity or amplitude. The neighbourhood may correspond to a pre-determined wavelength separation.

The pre-determined value may correspond to a change of less than 5%, alternatively, less than 3%, alternatively less than 1% over the neighbourhood and/or a pre-determined wavelength separation. The neighbourhood and/or pre-determined wavelength separation may correspond to or at least based on the resolution of the obtained response signals. The neighbourhood may comprise 1 nm, alternatively, 0.1 nm. The pre-neighbourhood or pre-determined wavelength separation may comprise the wavelength separation between consecutive shifted wavelengths.

The change may be smaller than a pre-determined threshold value. The change may be smaller than a threshold value over a neighbourhood comprising a pre-determined wavelength separation and/or between consecutive measured wavelengths of the shifted wavelengths.

Determining the fluorescence and Raman response may comprise processing the obtained response signals subject to a first constraint or condition based on the characteristics of the expected Raman response and subject to a second constraint or condition based on the characteristics of the expected fluorescence response.

The first constraint or condition may cause the determined Raman response to be modelled as a sparse signal and wherein the second constraint or condition causes the determined fluorescence response to be modelled as a smooth signal.

The modelled smooth signal may be represented as a smooth and/or continuous function. The modelled sparse signal may be represented as a sparse and/or discontinuous function.

The first constraint or condition may be applied by minimizing a measure of the size of the Raman response. The second constraint or condition may be applied by minimizing a measure of the variability of the fluorescence response.

The method may comprise minimizing or at least reducing the change of the fluorescence response to light of a first wavelength and light having a second wavelength local to the first wavelength.

The method may comprise defining a neighbourhood about the first and/or second wavelength. The method may comprise defining the variability locally where it may be computed in a neighbourhood defined by a parameter. The parameter may be pre-selected. The second wavelength be local to the first wavelength if the second wavelength is in the defined neighbourhood. The neighbourhood may be defined by a covariance matrix or other suitable mathematical function.

The measure of change may comprise a measure of change of the fluorescence response. The measure of change may comprise the variability of the signal locally. The Raman and/or fluorescence response may be represented by a spectrum over a range of wavelengths. The Raman and/or fluorescence response may be represented by a vector, wherein each component of the vector corresponds to a response value at a wavelength or wavenumber. The first and/or second constraints may be represented as a norm or magnitude of a vector representation of the responses and/or by a covariance matrix.

The effect of the first and second constraints on the determined responses may be controlled by respective first and second regularization parameters and wherein the method further comprises repeating the processing of the obtained response signals for different values of the first and second regularization parameters thereby to determine a plurality of Raman and fluorescence responses.

The method may comprise performing a selection process on the plurality of determined responses and selecting a desired Raman response and a desired fluorescence response in accordance with a pre-determine set of selection rules thereby to select on one of the plurality of determined response.

The set of selection rules may be based on a comparison between the degrees to which the determined Raman and/or fluorescence responses exhibit desired characteristics of the expected Raman and/or fluorescence response. The set of selection rules may be based on a comparison of a measure similarity between the determined Raman and fluorescence response for each set of parameters.

Obtaining response signals from the collected signal light may comprise performing a plurality of measurements corresponding to a plurality of excitation wavelengths and wherein processing the obtained response signals comprises applying a model that permits changes in the intensity of the Raman response and/or the fluorescence response over the plurality of measurements. By permitting changes in intensity of the Raman response and/or the fluorescence response over the plurality of measurements, the effect of photobleaching may be captured.

Processing the obtained response signals may comprise modelling a bias parameter representative of additive noise from the sensor. Processing the obtained response signals may further comprise applying a further constraint to ensure that the determined Raman response is non-negative.

Processing the obtained response signals may comprise determining at least one property of a Raman response spectrum and at least one property of a fluorescence response spectrum. The at least one property of the Raman response spectrum may comprise at least one property of one or more peaks. The at least one property of one or more peaks may comprise, for example, the size and/or wavelength and/or location of a peak and/or the number of peaks.

The at least one property of the fluorescence response spectrum may comprise at least one of: the size and shape of a smooth fluorescence background, the degree of smoothness of the fluorescence response spectrum.

Generating the shifted excitation light may comprise varying a temperature of a light source. The light source may be a laser diode. The light source may be a single-wavelength laser diode configured to produce shifted wavelength excitation light. The light source may comprise a plurality of laser diodes configured or operable to generate the shifted excitation light.

The method may comprise determining or estimating the wavelengths of the wavelength shifted light or the shift in wavelength of the wavelength shifted light and using the determined or estimated wavelengths or shifts in wavelength to determine the Raman and fluorescence response.

The wavelengths of the wavelength shifted light may be determined by performing a calibration process, for example, using signals measured from a sample of air or other calibration gas.

The determining may comprise performing a model fitting process comprising determining a set of model parameters to minimize a loss function wherein the value of the loss function is dependent on an estimated Raman response and an estimated fluorescence response. The loss function may comprise a quadratic loss function.

The method may comprise applying a machine learning derived process to determine one or more model parameters. The method may comprise applying a machine learning derived process to determine the Raman and fluorescence responses.

Determining the fluorescence response may comprise applying a pre-determined model to the obtained response signals. Determining the fluorescence response may comprise providing the obtained response signals as an input to a pre-determined model characterised by a set of pre-determined model parameters. The pre-determined model parameters may comprise the regularization parameters. The pre-determined model may provide, as an output, the fluorescence response and Raman response.

The fluorescence and Raman responses may be determined simultaneously.

The shifted excitation light may be provided to a first sample portion and a second sample portion. The method may further comprise collecting the signal light from the first and second sample portions. The first sample portion may be at a first position and the second sample portion may be at a second position and the method may comprise providing shifted excitation light to and collected signal light from the first and second positions. The determined Raman response may comprise a difference between the Raman response from a first sample portion and a second sample portion. The determined fluorescence response may comprise a difference between the fluorescence response from the first sample portion and the second sample portion.

The first sample portion may comprise a healthy tissue sample and the second sample may comprise an unhealthy tissue sample. The first sample portion may comprise a healthy tissue sample and the second sample may comprise an abnormal tissue sample.

The method may further comprise further processing the response signals to determine that the at least one sample is health and/or unhealthy. The method may further comprises processing the response signals to identify at least one sample that is healthy and/or abnormal. The at least one sample may comprise a first sample and a second sample. The first sample portion may be a portion of a first sample and the second sample portion may be a portion of the second sample. The method may further comprise providing first wavelength shifted excitation light to the first sample portion and collecting first signal light from the first sample and obtaining response signals from the first collected signal light. The method may further comprise providing second wavelength shifted excitation light to the second sample portion and collecting second signal light from the first sample and obtaining response signals from the second collected signal light.

The shifted excitation light may be characterised by at least a first wavelength shift between the at least two excitation wavelengths. The excitation light may comprise first light having a first excitation wavelength and/or having a range of wavelengths characterised by or including a first excitation wavelength. The excitation light may comprise second light having a second excitation wavelength and/or having a second range of wavelengths characterised by or including a second excitation wavelength. The first excitation wavelength may be one of a plurality of shifted wavelengths. The second excitation wavelength may be one of a plurality of shifted wavelengths. The shifted excitation wavelength may comprise a plurality of light having a corresponding plurality of excitation wavelengths and/or a plurality of range of wavelengths.

The shifted excitation light may comprise a plurality of excitation wavelengths. The obtained response signals may comprise at least a corresponding plurality of response signals. The obtained response signals may comprise a plurality of response signals. A response signal may be generated for each excitation wavelength. Each response signal may comprise intensity values at multiple wavelengths.

The shifted excitation light may comprise a plurality of excitation wavelengths. The plurality of excitation wavelengths may comprise a series of wavelengths separated by multiples of a pre-determined amount. The multiples may comprise positive non-zero integer multiples.

The model fitting process may comprise an iterative process comprising, updating at each iteration, estimates for the Raman response, the fluorescence response, relative intensities, size or magnitude of the fluorescence and Raman response and a bias term. The model fitting process may comprise determining that a convergence criteria or condition is satisfied.

In accordance with a second aspect, there is provided a Raman spectroscopy apparatus comprising: a shifted wavelength excitation light generator configured to generate shifted wavelength excitation light having at least two excitation wavelengths, wherein the generated shifted wavelength excitation light is for exciting a Raman response in at least one sample; a delivery path configured to deliver the generated shifted wavelength excitation light to the at least one sample; a collection path configured to collect signal light from the at least one sample; a response measurement device for obtaining response signals from the collected signal light; a processing resource configured to process the obtained response signals to determine a Raman response and a fluorescence response, wherein determining the Raman response uses at least one characteristic of an expected Raman response to the wavelength shifted excitation light and wherein determining the fluorescence response uses at least one characteristic of an expected fluorescence response to the shifted excitation light.

In accordance with a third aspect there is provided a computer implemented method comprising: processing obtained response signals to determine a Raman response and a fluorescence response, wherein the obtained response signals are representative of a response to wavelength shifted excitation light of at least one sample; wherein determining the Raman response uses at least one characteristic of an expected Raman response to the wavelength shifted excitation light and wherein determining the fluorescence response uses at least one characteristic of an expected fluorescence response to the shifted excitation light.

In accordance with a fourth aspect there is provided a non-transitory computer readable medium comprising instructions operable by a processor to process obtained response signals to determine a Raman response and a fluorescence response, wherein the obtained response signals are representative of a response to wavelength shifted excitation light of at least one sample and wherein determining the Raman response uses at least one characteristic of an expected Raman response to the wavelength shifted excitation light and wherein determining the fluorescence response uses at least one characteristic of an expected fluorescence response to the shifted excitation light.

In accordance with a fifth aspect there is provided a computer program product comprising computer-readable instructions that are executable to perform the method of the third aspect.

In accordance with a sixth aspect, there is provided a data processing apparatus comprising a processor configured to perform the method of the third aspect. Features in one aspect may be applied as features in any other aspect, in any appropriate combination. For example, method features may be provided as apparatus features or vice versa.

BRIEF DESCRIPTION OF THE FIGURES

Various aspects of the invention will now be described by way of example only, and with reference to the accompanying drawings, of which.

DETAILED DESCRIPTION

Shifted excitation Raman spectroscopy (SER) is a spectroscopy method that involves collecting multiple emission spectra by shifting the excitation of a light source by small amounts. Under this construction, the fluorescence spectrum remains fixed, but the Raman spectrum is expected to shift (in wavenumbers) by the same amount as the excitation spectrum. Embodiments described in the following, use these observed features, along with other expected spectral characteristics of the Raman and fluorescence responses to allow for an efficient separation and recovery of the Raman spectra.

In general, fluorescence suppression in Shifted excitation Raman spectroscopy addresses the problem of estimating a Raman spectrum given K spectra collected at different shifted excitations. Known methods of fluorescence suppression in (SER) may have drawbacks and/or limitations. For example, known Adaptive iteratively reweighted penalized least squares (AIRPLS) and Reconstruction of SERDS (RSERDS) approaches do not use multiple spectra. In addition, principal component analysis (PCA) approach may only find a Raman difference spectrum. Furthermore method using Poisson inverse problems (PIP) based approach assume that the relative intensities of fluorescence and Raman do not change over the shifted excitations wavelengths. In addition, methods using shifted independent component analysis (SICA) model the relative intensities but do not assume non-negativity of the spectrum and while shifted nonnegative matrix factorization approaches (SNMF) both model relative intensities and assume non-negativity of the spectrum, these approaches may not produce a sparse Raman spectrum. Finally, none of the known methods use the differences in the spectral characteristics of expected responses of the Raman and fluorescence. For example, while an expected Raman response spectrum comprise sharp peaks, often intermittent but possibly overlapping, over a zero baseline, the fluorescence spectrum varies smoothly, and it is usually present over the entire region of interest.

In the following, a method referred to as MSERS (Multi-Spectral Estimation of Regularization Spectra—in which regularized Raman and fluorescence spectra are estimated from multiple spectra collected through Shifted Excitation Raman Spectroscopy) and an apparatus for performing the method is described, in accordance with embodiments. The method may find a number of different application, for example, the method may be used to identify molecules. In addition, it will be understood that the apparatus may be used in vivo.

Figure 1:
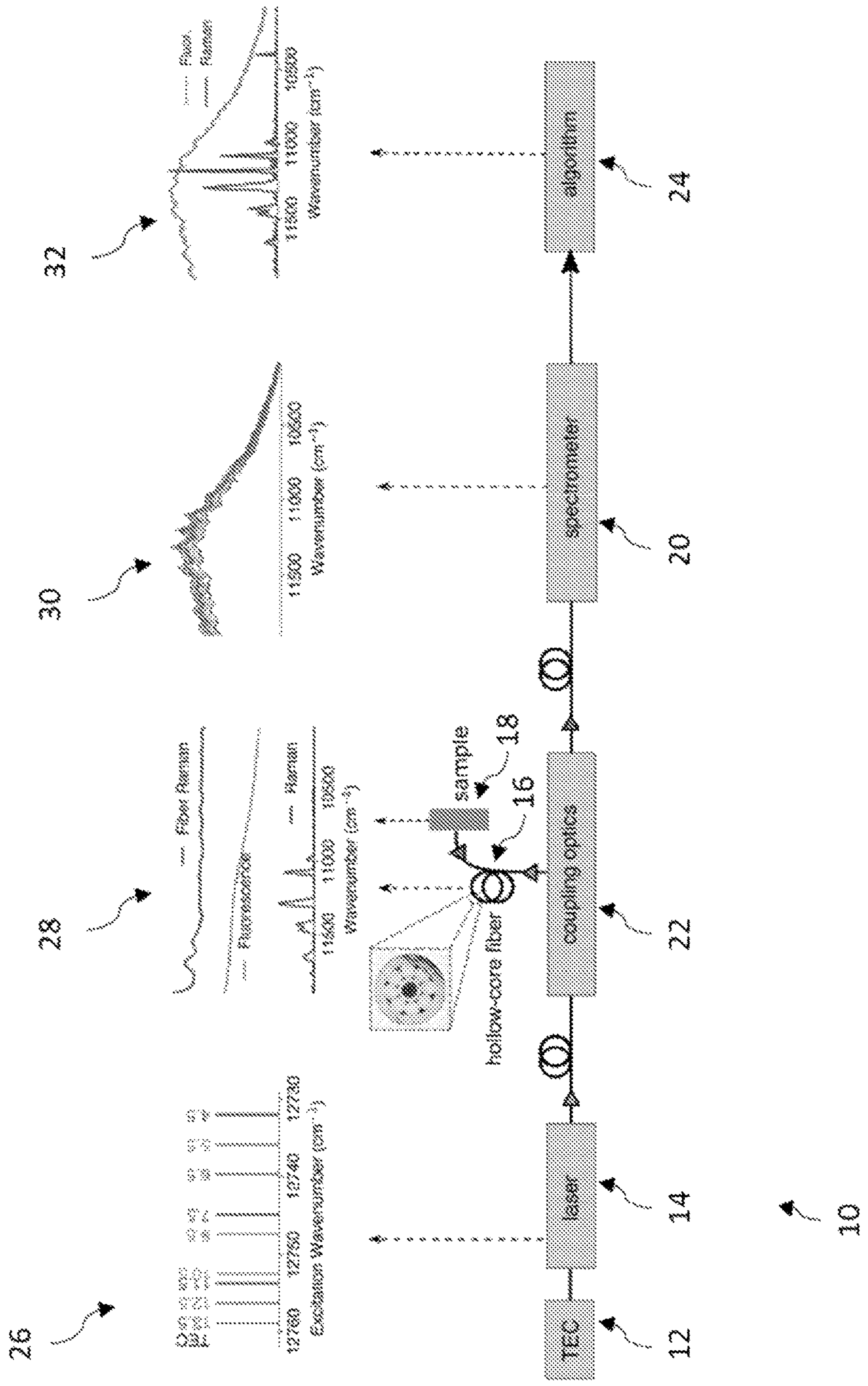
FIG. 1 is a schematic overview of a spectroscopic apparatus, in accordance with an embodiment.

FIG. 1 depicts an apparatus 10, in accordance with an embodiment. The apparatus 10 comprises a thermoelectric cooler (TEC) 12, a laser diode 14 (also referred to as a laser 14, for brevity), an optic fibre 16 (referred to as a fibre, for brevity), a spectrometer 20, coupling optics 22 and a processing resource 24.

The fibre 16 may form part of a probe for use in vivo to sense the environment inside the body (for example, at the distal end of the lung) by Raman spectroscopy. One potential issue with using a fibre-optic probe for sensing the environment inside the body by Raman spectroscopy is the possibility that the Raman response signal may be masked by the auto fluorescence of the surrounding tissue. In addition, obtaining a reliable reading quickly is particularly important for in vivo applications in order to avoid discomfort and/or movement artefacts. By reducing the number of multiple measurements taken, a linear decrease in acquisition time may be obtained. In addition, capturing the shape of the spectra using regularization, in accordance with embodiments, may improve reliability of the obtained spectra.

In the present embodiment, the laser 14 is coupled to the thermoelectric cooler (TEC) 12 and together they may be considered to form a shifted wavelength excitation light generator. In the present embodiment, the laser 14 is a 785 nm laser diode (DBR785S, Thorlabs; line width<0.1 nm). The wavelength used in the present embodiment is selected, for example, to utilize the lower auto fluorescence present in the near-infrared window in biological tissue and to allow efficient coupling and collection into the fibre 16 which is a bespoke Raman fibre. However, it will be understood that other wavelengths may be used in other embodiments. The TEC 12 uses a change in temperature to tune the wavelength of the laser diode to match different laser cavity modes and hence allows access to a range of excitation wavelengths. In the present embodiment, the TEC 12 is configured to control the laser to generate shifted excitation light having up to 10 wavelengths around 785 nm. The average laser output power at the distal end of the fibre is 20 mW, however, it will be understood that this may vary slightly between wavelengths. This may result in different measured intensities between subsequent shifts in wavelength. While the laser power is 20 mW it will be understood that slight variations in the laser power may be measurable. It will be understood that other laser suitable laser powers may be used.

The fibre 16 has a light delivery portion and a light collection portion extending through its length. In the present embodiment, the fibre 16 is a bespoke Raman fibre. The Raman fibre has a hollow-core NCF (negative curvature fibre) surrounded by multimode fibres. The hollow-core NCF is used to transport light to the sample and this part provides the light delivery portion. The surrounding multimode fibres collect the Raman scattering from the sample and thus provides the light collection portion.

The fibre 16 is coupled to the laser via the coupling optics 22. The fibre 16 is further coupled to the spectrometer 20 via the coupling optics 22. In particular, a collected light signal is coupled from the fibre 16 via the dichroic mirror into a multimode patch cable and fed, via the fibre 16, to the spectrometer 20.

The apparatus 10 thus has a light delivery path provided between the laser 14 and the sample 18 (formed in part by the coupling optics 22 and the light delivery portion of the fibre 16). The apparatus 10 also has a signal light collection path provided between the sample 18 and the spectrometer (formed in part by the coupling optics 22 and the light collection portion of the fibre 16).

In the present embodiment, the spectrometer 22 is a QePro Raman, Ocean Insight. The spectrometer 22 is configured to detect the collected signal light and records the collected signal light as response signals. A response signal is recorded for each excitation wavelength. As described in further detail in the following, each recorded response spectrum is acquired in response to a shift in the wavelength of the excitation light generated by the laser 14. The response signals are converted to response spectra using the commercial software OceanView (Ocean Insight). In the present embodiment, each response spectrum is recorded within the spectral range of 840 nm to 992 nm (834 $cm^{-1}$ to 2658 $cm^{-1}$ in Raman shift for the excitation 785 nm). The spectrometer 20 is an example of a response measurement device for obtaining response signals from the collected signal light, and it will be understood that, in other embodiments, other response measurement devices can be used. For example, suitable devices include any device configured to convert signal light to a response signal, for example, a response signal as a function of frequency, wavelength or wavenumber.

A further processing resource 24 processes response signals detected by the spectrometer. In some embodiments, the system has a controller (not shown) for controlling the TEC and/or the laser to control the generation of the wavelength shifted excitation light. While control over the wavelengths is provided by changing the TEC, such control is not entirely deterministic, i.e., the wavelength may change slightly even for the same TEC setting. However, in further embodiments, multiple lasers may be used, where each laser has a fixed (but slightly different) wavelength.

In operation, shifted excitation light is generated by the TEC 12 by tuning the temperature of the laser 14. The shifted excitation light is represented by graph 26 which depicts 9 excitation wavenumbers. The shifted excitation light produced by the laser 14 is then delivered to the sample 18 via the delivery path: the light is first coupled to the fibre 16 by part of the coupling optics 22 and then transmitted to a target region of the sample 18 via the delivery portion of the fibre 16. In the present embodiment the further processing resource 24 is provided separately from the spectrometer 20, however, it will be understood that signal detection and processing may, in some embodiments, be provided as part of the same processing resource. In some embodiments, the further processing resource may be a programmable processor or programmable logic, resource, for example, a FPGA or a digital signal-processing controller.

Signal light from the target region of the sample 18 is then collected, via the collection path of the apparatus. In detail, the signal response light is collected by the collection portion of the fibre 16 and then coupled, via the coupling optics 22, to the spectrometer 20.

It will be understood that the collected signal light (see graph 28) comprises fluorescence response light, Raman response light and fibre Raman background response light. The signal light is then converted, at the spectrometer 20 to response signals, which may be represented graphically as a plurality of response spectra (depicted in graph 30). The response signals are processed to determine a Raman response spectra and a fluorescence response spectra, as described in further detail with reference to FIG. 2.

Figure 2:
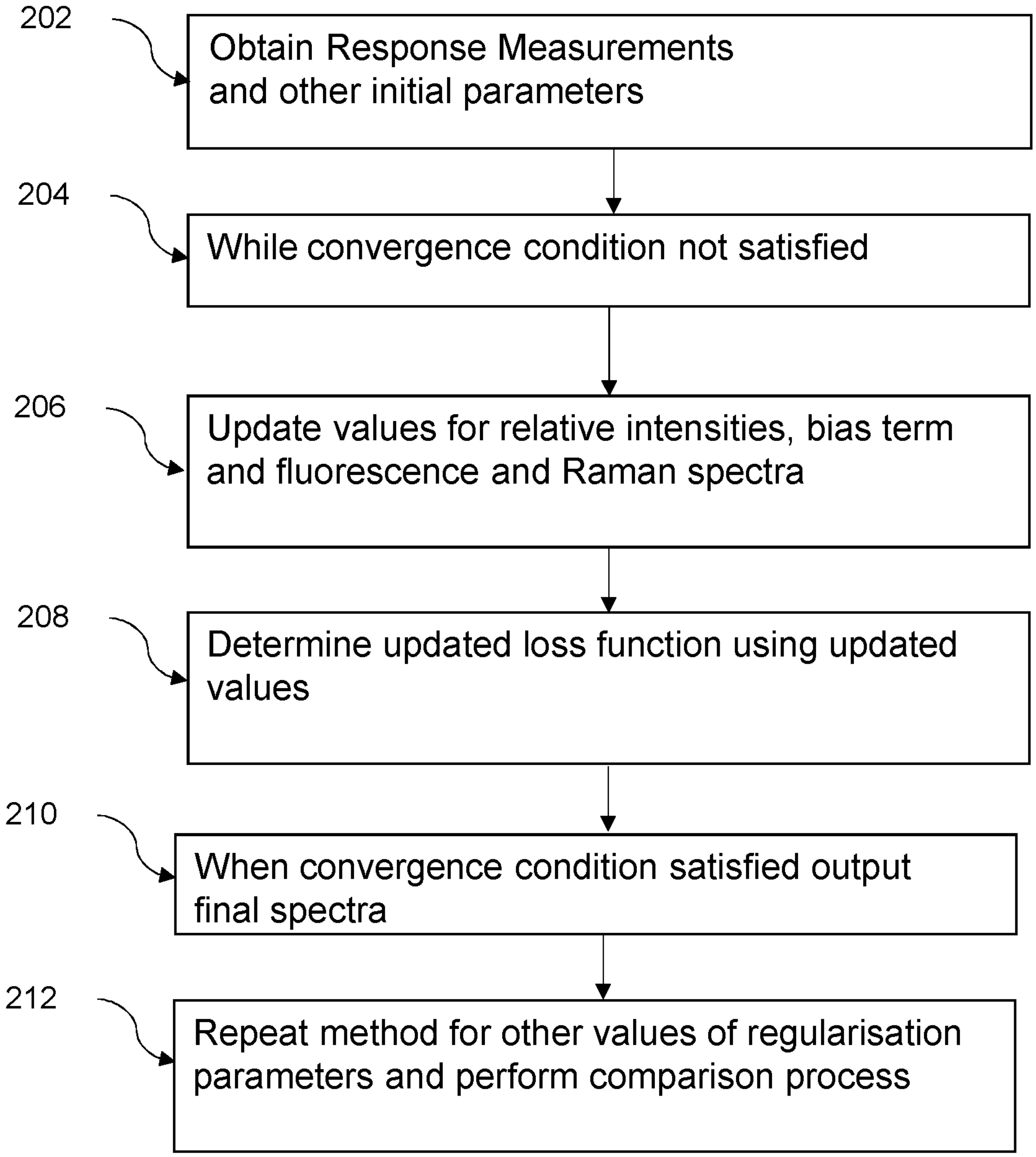
FIG. 2 is a flow-chart showing, in overview, a spectroscopic method, in accordance with an embodiment.

FIG. 2 is a flowchart depicting a method of Raman spectroscopy, in accordance with an embodiment. The method is described in further detail following a description of the theoretical framework for the method of FIG. 2. Mathematical notation used in the following are as follows: a function over wavenumber $\tilde{v}$ is represented by lower case letters, for example $x(\tilde{v})$. Wavenumber in $cm^{-1}$ is the number of wavelengths ($\lambda$ in nm) in unit length or $\tilde{v}=10^7/\lambda$. The values of the function over N wavenumbers are represented by a column vector with lower case bold letters (for example, $x=[x(\tilde{v}_1), \ldots, x(\tilde{v}_N)]^T$ where T denotes transpose. The $n^{th}$ entry of the vector x is represented using lower case letters, i.e., $x_n$ which is equivalent to $x(\tilde{v}_n)$. Matrices are represented using upper case bold letters, e.g., X, and the (i, j)-th ($i^{th}$ row and $j^{th}$ column) entry of the matrix as $X_{ij}$. The n-th column of the matrix X is represented as $x_n$, (i.e. $X=[x_1, \ldots, x_N]$).

In the following, $r(\tilde{v})$ and $f(\tilde{v})$ represent the Raman response spectrum and the fluorescence response spectrum, respectively. The fluorescence response spectrum may also be referred to as background in this context. In addition, y(k) represents the k-th observed spectrum that is obtained from the sample, for example, using the apparatus of FIG. 1. The k-th observer spectrum is obtained from the k-th response signal. Each response signal (and hence observed spectrum) is acquired by shifting the excitation wavelength by a small amount $\Delta\tilde{v}_k$. For example, for the first excitation wavelength: $\Delta\tilde{v}_1=0$.

Each observed spectrum may be described (in a noise-free situation) as a combination of the underlying Raman and fluorescence spectra. Mathematically, this may be represented as:

$$y^{(k)}(\tilde{v}) = r(\tilde{v}-\Delta\tilde{v}_k) + f(\tilde{v})$$

It is assumed that each observed spectrum is acquired at N equispaced wavenumbers $\tilde{v}_n$ with $n\in\{1, \ldots, N\}$ and that shifting the excitation by $\Delta\tilde{v}_k$ in wavenumbers is equivalent to shifting it by $\Delta n_k$ indices:

$$r(\tilde{v}_n-\Delta\tilde{v}_k) = r(\tilde{v}_{n-\Delta n_k})$$

However, it will be understood that $\Delta n_k$ for $k\in\{1, \ldots, K\}$ where K is the total number of excitations or shifts (counting $\Delta n_1=0$ as a shift) do not have to be contiguous. Each observed spectrum corresponding to a different excitation wavelength may therefore be mathematically represented as:

$$y_k = L^{(\Delta n_k)}r + f$$

where $y_k=[y^{(k)}(\tilde{v}_1), \ldots, y^{(k)}(\tilde{v}N)]^T$ is the column vector of the $k^{th}$ observed spectrum, $L^{(\Delta n_k)}\in\mathbb{R}^{N\times N}$ is a lower shift matrix that shifts the vector r by $\Delta n_k$ indices:

$$l_{ij}^{(\Delta n_k)} = \begin{cases} 1 & \text{if } i = j + \Delta n_k \\ 0 & \text{otherwise} \end{cases}$$

In these equations, $r\in\mathbb{R}^N$ and $f\in\mathbb{R}^N$ represent the Raman and fluorescence response to be determined. In this embodiment, the Raman and fluorescence responses are represented by vectors. It will be understood that each element of the vector is an intensity of response at a different wavenumber, such that each of the vectors r and f may also be considered as a distribution over a wavelength range or a response spectrum. It will be understood that the method relates to determining one or more properties of the Raman and/or fluorescence responses. In the embodiments described in the following, N is 1418, therefore the Raman spectrum and the fluorescence spectrum that are being determined are each represented by a 1418 element column vector.

A common feature of methods in which subsequent Raman measurements are performed is photobleaching where fluorescence intensity reduces over time due to sustained laser exposure. Additionally, the spectrometer may produce a small output signal even in the absence of incident light. This is referred to as a dark current. To accommodate these features, the following representation of the observed spectra is used in the present embodiment:

$$y_k = \alpha_k L^{(\Delta n_k)} r + \beta_k f + b_k$$

where, as described above, $y_k=[y^{(k)}(\tilde{v}_1), \ldots, y^{(k)}(\tilde{v}_N)]^T$ is the column vector of the $k^{th}$ observed spectrum, $L^{(\Delta n_k)} \in \mathbb{R}^{N \times N}$ is a lower shift matrix that shifts the vector r by $\Delta n_k$ indices i.e.:

$$l_{ij}^{\Delta n_k} = \begin{cases} 1 & \text{if } i = j + \Delta n_k \\ 0 & \text{otherwise} \end{cases}$$

and $r \in \mathbb{R}^N$ and $f \in \mathbb{R}^N$ are the vectors of the Raman and fluorescence spectra, as described above. In addition, α and β denote the intensities of the Raman and fluorescence spectra, respectively and b represents a bias term.

One or more characteristics of an expected Raman and fluorescence responses are used to determine the Raman and fluorescence responses. In the present embodiment, a characteristic of the excepted Raman response that is used to determine the Raman response is the sparsity of an expected Raman response spectrum and a characteristic of the expected fluorescence response that is used to determine the fluorescence response is the smoothness of the excepted fluorescence response spectrum.

The sparsity of the Raman response spectrum may be encoded in several ways. In particular, constraints or conditions may be applied to or as part of a loss function to ensure that the modelled Raman response is represented by a sparse distribution. In the present embodiment, a constraint corresponding to minimizing the $l_1$ norm of the Raman response spectrum is applied. While this approach may not capture the complete spectral characteristics of the Raman spectrum, for example, the local 'smoothness' in regions where the peaks appear may not be captured, however, it is observed that the $l_1$ regularization distinguishes the Raman spectrum from fluorescence well.

The smoothness of the fluorescence spectrum may also be modelled in several ways by applying constraint or conditions to or as part of a loss function. A typical solution is to use Tikhonov regularization as in AIRPLS. This may be represented as: $\|Df\|^2=f^TD^TDf$ where $D=I-L^{(1)}$ is the difference matrix of size N×N. However, it is observed that this regularization might not sufficiently suppress the fluorescence spectrum. In this equation L is defined as above and I is the identify matrix. Therefore, a more generalized regularization of the form $f^TK^{-1}f$ is used, where K is a suitable covariance matrix, e.g. $k_{nn}=\exp(-(n-n')^2/l^2$ where l controls the smoothness of the covariance function. The parameters of the covariance function may be optimized as part of the optimization process. However, for simplicity, this parameter is set to l=N/4. A small regularization parameter $\in=10^{-6}$ to avoid instability of the matrix during inversion such that the resulting regularization term is $f^T(K+\in I)^{-1}f$. It will be understood that the choice of I here (the width of the Gaussian function) that controls the values of the K matrix, thus defining, in part, the neighbourhood in which values of fluorescence remain the same or substantially the same such that the response signal is smooth. The size of the neighbourhood is also controlled by the regularisation parameter. The regularisation thus term applies a constraint to ensure that the determined fluorescence response has a desired degree of smoothness. While the above described embodiment, described one form of the regularisation term in which the regularisation term is imposed using a covariance function controlled by a smoothness parameter (in this case a width parameter I) it will be understood that the regularisation term may have different forms.

In some embodiments, the regularisation term applies a constraint to ensure that the determined fluorescence response has a change over a suitably defined neighbourhood that is sufficiently small (for example, smaller than a pre-determined threshold).

In general, in the present embodiment, a first constraint that causes the determined Raman response to be modelled as a sparse distribution is applied and a second constraint or condition causes the determined fluorescence response to be modelled as a smooth distribution is applied. The first constraint is applied by minimizing a measure of the size of the Raman response (the norm). The second condition is applied by minimizing a measure of variability of the fluorescence response (for example, the pairwise difference of the signal at different wavenumbers).

A normal noise model is assumed, in the present embodiment, however, a more flexible distribution such as a Poisson or negative binomial may be used. However, choosing a standard noise model simplifies the resulting optimization problem. Thus, the following loss function is minimized in order to find values for the Raman response r, the fluorescence response f and values for the intensity of the Raman and fluorescence spectra respectively, and values for the bias term (r, f, α, β, b):

$$c = \sum_{k=1}^{K} \left| y_k - \left(\alpha_k L^{(\Delta n_k)} r + \beta_k f + b_k\right)\right|^2 + \lambda_f f^T \tilde{K} f + \lambda_r |r|_1$$

where $\lambda_f$ and $\lambda_r$ are regularization parameters for the fluorescence and Raman spectrum respectively and $\tilde{K}=(K+\varepsilon I)^{-1}$ can be pre-computed. $\|\bullet\|_1$ and $\|\bullet\|_2$ denote $l_1$ norm and $l_2$ norm, respectively. It will be understood that the subscript here refers to the 'size' of the norm, i.e., 1 or 2. In the first term of the cost function, the subscript 2 is not used, since by default the norm is assumed to be 2-norm. It will be understood that this loss function may be considered as a sum of components for each excitation wavelength (i.e. summed over 1 to K).

In the present embodiment, Block Coordinate Descent (BCD) is used to minimize the loss function. In this approach, the problem is split into K+2 blocks, such that at each iteration, the loss function for a specific block is minimized while fixing the values of the other blocks, and we repeat this over each block until convergence.

The K+2 blocks are the Raman response r, the fluorescence response f, and the K triplets $(\alpha_k, \beta_k, b_k)$ respectively. These blocks are updated using either non-negative least squares (NNLS) or non-negative least absolute shrinkage and selection operator (NNLASSO). NNLS solves $\min_{x\geq 0} \|d-Cx\|^2$ and NNLASSO solves $\min_{x\geq 0} \|d-Cx\|^2+\lambda\|x\|_1$. The quadratic cost is expressed as $x^TAx-2b^Tx$, however the two forms are equivalent with C=CHOL(A) and $d=(C)^{T^{-1}}b$ where CHOL denotes Cholesky decomposition.

It will be understood that, while BCD is used to minimize the loss function in the present embodiment, other solvers and methods of minimizing the function may be used in other embodiments.

With regard to FIG. 2, a schematic overview of the method of Raman spectroscopy is provided. An example algorithm is also represented in Table 1. In the present embodiment, the algorithm is implemented in Python3 and known solvers for NNLS and NNLASSO are used, as described above, and existing peak detection tools for estimating shifts in the wavelength excitations. The shift in excitation is determined from the shift in emission spectra at very specific locations or regions of interest corresponding to known peaks. The peak location in the region of the interest is then found using known peak detection algorithms. Any small negative values (i.e., $y_{kn}<0$) are set to 0 and normalize the pooled spectra Y to be between 0 and 1.

TABLE 1

| Algorithm 1 MSERS |
| --- |
| Input: Y, $\{\Delta n_k\}_{k=2}^{K}$, $\tilde{K}$, $\lambda_r$, $\lambda_f$, $i_{max}$, tol |
| Require: $Y \geq 0$ |
| Initialize Raman $r^{[0]}$ and fluorescence $f^{[0]}$ spectra |
| $i = 0$, $c^{[-1]} = 0$, $c^{[0]} = 0$ |
| while $i \leq i_{max}$ & $\lvert c^{[i]} - c^{[i-1]}\rvert \geq tol \times c^{[i-1]}$ do |
| $i = i + 1$ |
| for $k \in \{1, \ldots, K\}$ do |
| update $(\alpha_k, \beta_k, b_k)^{[i]}$ using Eq. (P1) |
| end for |
| update $f^{[i]}$ using Eq. (P2) |
| update $r^{[i]}$ using Eq. (P3) |
| update $c^{[i]}$ using Eq. (C) |
| end while |
| return (r, f, α, β, b) |

In overview, at step 202, the response signals are obtained. In the present embodiment, the values of the measured response spectra are obtained and these are represented by the matrix Y. A response signal corresponding to a measured response spectrum is obtained for each of the K shifted wavelengths. The shifts in excitation wavelength $\Delta n_k$ are also obtained and provided as an input. Predetermined values for the regularization parameters $\lambda_f$ and $\lambda_r$ are also retrieved, together with parameters that control the iterative process: $i_{max}$ is the maximum number of iterations for the iterative process. At step 202, other vectors and variables used in the iterative process are initialized. For example, the regularized covariance matrix $\tilde{K}$ is also initialized. The parameter tol stands for tolerance and represents the tolerance of difference between two consecutive cost values. If the difference between consecutive cost values is below tolerance then it is determined that the cost has not changed to a sufficient degree in the two successive iterations and the method is then stopped.

The method also used the shift in excitation wavelength to determine the spectra. Although the shift in excitation (represented by $\Delta n_k$ in discrete indices, and $\Delta\tilde{\nu}_k$ in a continuous scale) could be detected using a second spectrometer, in the present embodiment, the shift in excitation is estimated using a measured emission spectra as part of a calibration step. In further detail, the air in the hollow-core NCF results in two distinct Raman peaks at 1555 $cm^{-1}$ and 2331 $cm^{-1}$ (in Raman shift), (see FIG. 5) due to the presence of oxygen and nitrogen in the air. These characteristic peaks (in wavenumber) can be used to compute the shift in excitation. Although both peaks provide similar estimation, the oxygen peak is used as after converting to wavenumber (signal is recorded in wavelength), the resolution of the observed spectra around the oxygen peak is higher than around the nitrogen peak. This inherent calibration step simplifies the experimental set-up by eliminating the need to use a second spectrometer and does not add further uncertainties such as calibration and synchronization. In the present embodiment, the TEC and laser may be inaccurate and therefore the exact shift should be captured either with a spectrometer or from emission spectra. In the present embodiment, air is present in the hollow core fibre and therefore the characteristic $O_2$ and $N_2$ peaks appears naturally. In other embodiments, in which a different type of fibre is used that does not have air present, the characteristics $O_2$ and $N_2$ peaks may not appear. In the present embodiment, the calibration step is performed after each individual measurement to obtain the shift in excitation.

In the present embodiment, the Raman response is initialized using a standard deviation across the raw spectra for each wavenumber. In more detail, each element of the Raman response represented by r is assigned a value of the standard deviation. The fluorescence response is also initialized as the minimum value across the raw spectra for each wavenumber. The algorithm is said to converge if the relative change in loss between subsequent iterations is at most tol=$10^{-3}$ and a maximum number of iterations $I_{max}$=100 is set to manage the run-time. The regularization parameters $\lambda_f$ and $\lambda_r$ are also initialized at step 202. The standard deviation and minimum is defined over K signals for each wavenumber.

At step 204, the iterative process starts. At step 204, it is determined whether a convergence condition is met. The convergence condition compares the value of the loss function from the present step to the value of the loss function from the previous step. If the relative difference between the present value and the preceding value is smaller than a pre-determined amount (set by parameter tol) then the convergence condition is satisfied and the method terminates. Alternatively, the iterative process may end when the iterative step reaches the maximum allowed (as set by parameter $I_{max}$).

If the convergence condition is not yet met, the method continues to step 206. At step 206, values for the intensities, biases, Raman and fluorescence responses are determined and updated for the present step, as described in the following. The updated values are then used to determine the value for the loss function for the present step.

Intensities and bias update: The $(\alpha_k, \beta_k, b_k)$ values for each k=1, . . . , K shift (for each excitation wavelength) are updated by solving the following optimization:

$$\min_{\alpha_k,\beta_k,b_k\geq 0}\left\|y_k-\left(\alpha_k L^{(\Delta n_k)}r+\beta_k f+b_k\right)\right\|^2$$

This is a NNLS optimization problem:

$$\min_{x\geq 0}\|d-Cx\|^2$$

With $C=[L^{((\Delta n_k))}r, f, 1]$ and $x=[\alpha_k, \beta_k, b_k]^T$. $L^{(\Delta n_k)}r$ does not need to be computed explicitly through matrix multiplication but the vector r can be shifted.

Fluorescence Update

The fluorescence response (represented by vector f) is updated by solving the following optimization, $$\min_{f\geq 0}\left\|y_k-\left(\alpha_k L^{(\Delta n_k)}r+\beta_k f+b_k\right)\right\|^2+\lambda_f f^T\tilde{K}f$$

This can again be expressed as a NNLS optimization as:

$$\min_{f\geq 0}\sum_{k=1}^{K}\left\|y_k^f-\beta_k f\right\|^2+\lambda_f f^T\tilde{K}f\equiv$$

$$\min_{f\geq 0}f^T\left[\left(\sum_{k=1}^{K}\beta_k^2\right)I+\lambda_f\tilde{K}\right]f-2\left[\sum_{k=1}^{K}\beta_k y_k^f\right]^T f$$

With $$y_k^f=y_k-\left(\alpha_k L^{(\Delta n_k)}r+b_k\right)\cdot L^{(\Delta n_k)}r$$

can be evaluated efficiently by shifting r.

Raman Update

The Raman response (represented by a vector r) is updated by solving the following optimization:

$$\min_{r\geq 0}\sum_{k=1}^{K}\left\|y_k-\left(\alpha_k L^{(\Delta n_k)}r+\beta_k f+b_k\right)\right\|^2+\lambda_r\|r\|_1$$

This can be expressed as a NNLASSO optimization as:

$$\min_{r\geq 0}\sum_{k=1}^{K}\left\|y_k^r-\alpha_k L^{(\Delta n_k)}r\right\|^2+\lambda_r\|r\|_1\equiv$$

$$\min_{r\geq 0}r^T\left[\sum_{k=1}^{K}\alpha_k^2 I\right]r-2\left[\sum_{k=1}^{K}\alpha_k y_k^{rT}L^{(\Delta n_k)}\right]r+\lambda_r\|r\|_1$$

Where $$y_k^r=y_k-\beta_k f-b_k\cdot y_k^{rT}L^{(\Delta n_k)}$$

can be evaluated efficiently by shifting $$y_k^r.$$

At step 208, an updated value for the loss function is calculated. At step 210, the updated loss function is compared to the previous loss function in accordance with a convergence condition. If the convergence condition is met, the method proceeds to output the final determined Raman response r and fluorescence response f.

As discussed above, the regularization parameters $\lambda_f$ and $\lambda_r$ are initialized at step 202. At step 210, the determined Raman and fluorescence responses are stored and then method (including method steps 202 to 210) are repeated for new values of regularization parameters. In further detail, the regularization parameters are set up as $\lambda(\bullet)=KN10^{-\lambda^{e(\bullet)}}$ and select $$\lambda_f^e \text{ and } \lambda_r^e$$

using internal validation. In the present embodiment, the algorithm is run for several values of the regularization parameters: i.e., $$\lambda_r^e\in\{11, 10, 9, 8\}\text{ and }\lambda_f^e\in\{12, 11, 10, 9, 8, 7\}.$$

The determined responses for each pair of parameters is stored and a selection process is performed to select the solution (i.e. the determined Raman and fluorescence responses) in accordance with pre-determined selection rules. For example, the results are processed to ensure adequate sparsity and distinguishability. These conditions are calculated as the inverse correlation between the Raman and fluorescence responses. In this embodiment, the selection rules first select the determined Raman spectra that having moderate sparsity (between 0.3 and 0.7) and, secondly, the determined Raman and fluorescence spectra that are least correlated to each other. In the present embodiment, sparsity is determined as the fraction of Raman spectrum values that are above a pre-determined threshold. For example, if that fraction is 0 then it implies that the signal is 0 and if that fraction is 1 then this implies that there are no small values in the signal. In the present embodiment, a sparsity threshold in the range between 0.3 and 0.7 is used. It will be understood that other sparsity threshold values may be suitable.

Although hollow-core NCFs may reduce the Raman background from the optical fibres significantly, Raman background may remain present in the observed signals. Raman background exhibits shifts similar to the Raman spectrum of interest. Therefore the Raman background cannot be explicitly modelled as either f or r in this background effectively to reveal a Raman spectrum with zero baseline since although this background (referred as g) shifts with $\Delta n_k$, its relative smoothness allows it to be estimated as fluorescence (i.e., $f+L^{(\lambda n_k)}(g+r)\approx(f+g)+L^{\Delta n_k}r$ over sufficiently small $\Delta n_k$, and f+g is smooth).

In the present embodiment, for each measurement (i.e. for each shift of excitation wavelength) the measured value has 1044 data points that span a spectral range of 840 nm to 990 nm. Each spectrum is taken on a wavelength axis with unequal resolution, decreasing from 0.167 nm at lower wavelengths to 0.126 nm at longer wavelengths. The wavelengths are converted to wavenumbers $\tilde{v}$. As described above, the multi-spectra algorithms feature a 'shift', i.e., $\Delta\tilde{v}_k$. Applying this shift to unevenly spaced wavelengths will result in misalignment. Therefore, in the present embodiment, linear interpolation is used to project the intensity values onto an equispaced grid. In further detail, if the wavelengths are not equally spaced then applying a shift then the grids are still aligned. As a not limiting example, a shift of say 1, to [1, 2, 4, . . . ] will result in [2, 3, 5, . . . ] (as opposed to [1, 2, 3, . . . ] being [2, 3, 4, . . . ]). The resolution of this grid is equal to the highest resolution (smallest spacing) of the original uneven grid. This changes the length of each single spectrum to N=1418. In further detail, in the present embodiment, the determine spectra were converted to Raman shifts $\delta\tilde{v}=\tilde{v}-\tilde{v}_0$ for visualization and comparison with known characteristic peak locations where $\tilde{v}_0$ is the first excitation wavelength corresponding to $\Delta\tilde{v}_1=0$.

Using the system of FIG. 1, two reference samples were investigated (Cyclohexane and Sesame oil) together with a further sample of ex vivo Healthy tissue from human lung. For liquid compounds, the distal end of the optical fibre was immersed in the compound but for tissue it had direct contact with the surface. Experimental results are depicted in FIGS. 3 to 6 and discussed in the following.

For each sample, 14 temperature steps were set on the TEC control. Due to mode locking conditions, not all steps resulted in excitation wavelength shift, and due to environmental conditions, such as laboratory temperature changes, the exact excitation wavelength positions are difficult to repeat. Therefore, in this embodiment, the first 10 spectra with lower TEC setting are considered only as the higher TEC settings (with lower excitation wavelength) do not necessarily enter a new mode lock. The selection of the first 10 spectra may be dependent on the stability of the excitation. For example, if the excitation is stable then the corresponding emission cannot be trusted and hence, it is removed from the analysis. This gives K=10 excitation wavelengths. For each K, 10 repeated measurements were taken to avoid saturation of the sensors with exposure time $t_{exp}$. These repeated measurements are then summed i.e., the integration time is $t_{int}=10t_{exp}$ and the acquisition time is $t_{acq}=Kt_{int}$. As discussed below, for Cyclohexane and Sesame oil, $t_{acq}=10$ s, and for Healthy tissue, $t_{acq}=50$ s.

Figure 5:
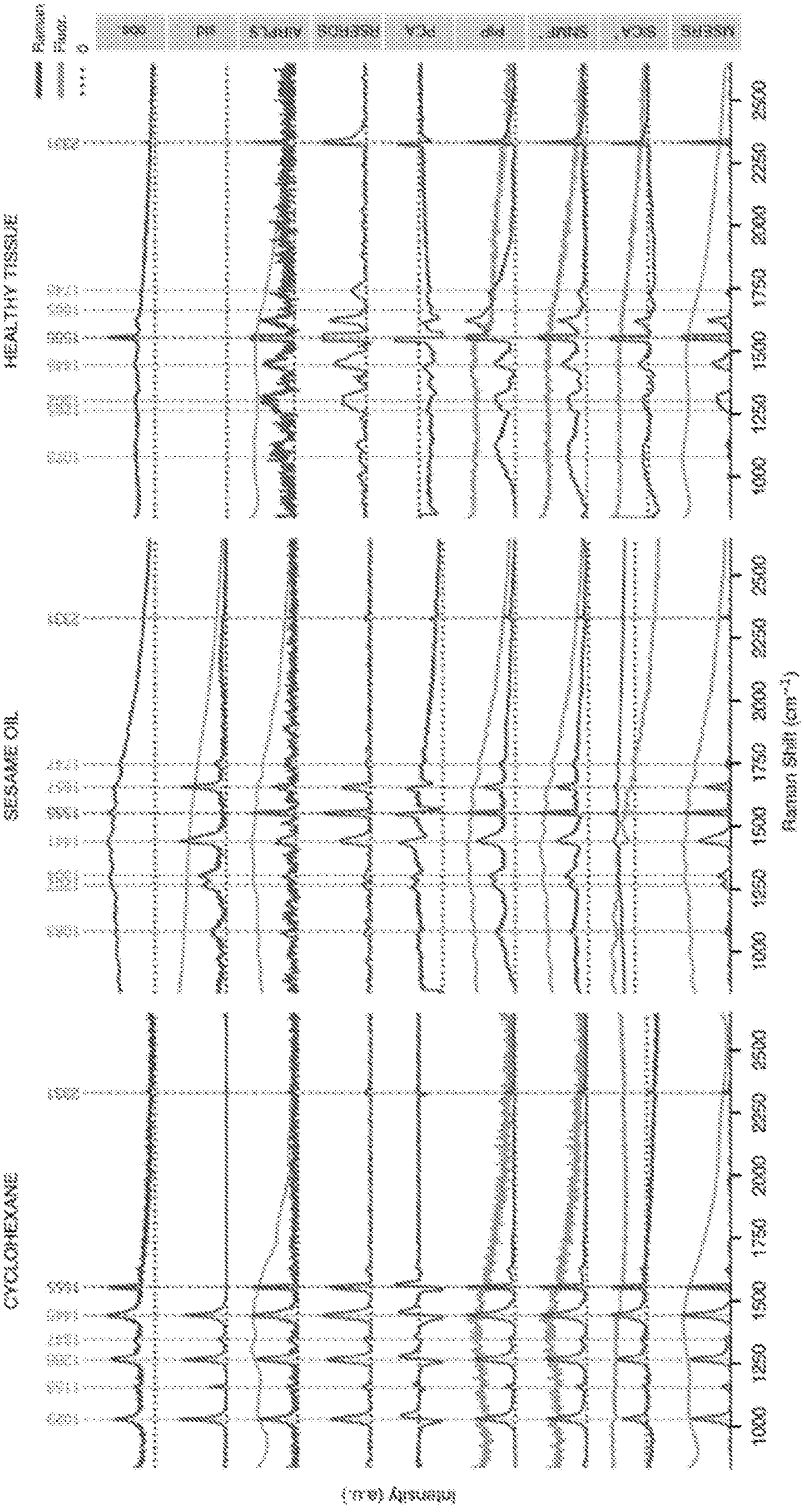
FIG. 5 is a third graph of further experimental results obtained using embodiments, and FIG. 6 a further table of experimental results obtained using embodiments.

1) Cyclohexane: Cyclohexane (1.02822, cyclohexane for spectroscopy Uvasol®, Supelco, Merck KGaA) is a chemical compound popular in Raman spectrometer calibration due to its well-known Raman spectrum and the fact that it has no fluorescence background. An example observed spectrum of cyclohexane is shown in FIG. 5 (left hand side) (the background observed in the figure is the Raman background from the fibre). It is characterized by three large peaks of similar intensities occurring around 1029 $cm^{-1}$, 1267 $cm^{-1}$ and 1445 $cm^{-1}$. Additionally there is a less intense peak at 1158 $cm^{-1}$ and a weaker, broader peak at 1347 $cm^{-1}$.
2) Sesame oil: The Raman spectrum of sesame oil (Toasted Sesame Oil 250 mL, Tesco) has large, well known peaks but also a high level of fluorescence background. An example observed spectrum of sesame oil is shown in FIG. 6 (middle). The Raman spectrum is characterized by two large peaks at 1441 $cm^{-1}$ and 1657 $cm^{-1}$ with smaller peaks at 1267 $cm^{-1}$ and 1304 $cm^{-1}$ creating a double peak and further small peaks at 1083 $cm^{-1}$ and 1747 $cm^{-1}$.
3) Healthy tissue (lung): An ex vivo human lung tissue sample was obtained from a patient who was recruited from New Royal Infirmary of Edinburgh (NHS Lothian BioResource, reference 15/ES/0094), diagnosed with suspected or confirmed lung cancer and undergoing thoracic resection surgery. Peripheral lung tissue (>5 cm away from tumour margin) was obtained from the resection sample. An example observed spectrum of tissue is shown in FIG. 5 (right hand side). Raman peaks from tissue are weak and complex to interpret as the peaks can overlap. They may also be almost completely masked by the strong auto fluorescence of tissue. It has been found that lung tissue has four relatively strong peaks: there are broad double peaks, at 1265 $cm^{-1}$ and 1302 $cm^{-1}$, a large peak at 1445 $cm^{-1}$ and one at 1665 $cm^{-1}$. Additionally, there are a large number of small peaks between 800 $cm^{-1}$ and 1200 $cm^{-1}$, the most prominent one at 1078 $cm^{-1}$ and another at 1745 $cm^{-1}$.

The following comments regarding results of experiments are also provided.

Peak evaluation: The peaks detected from the estimated Raman spectrum are compared with their respective true or suggested locations in terms of precision, i.e., number of true peaks detected over the total number of peaks detected, and recall, i.e., number of true peaks detected over the total number of true peaks. A true positive is counted if the true peak location falls within the peak width of the detected peak. Detected peaks are those whose height from the baseline is at least 5% that of the oxygen peak for Cyclohexane and Sesame oi, and nitrogen peak for Healthy tissue, and peak width is less than 200.

Signal-to-noise ratio: SNR is quantified in terms of the ratio of the peak intensity (oxygen peak for Cyclohexane and Sesame oil and nitrogen peak for Healthy tissue, both from the baseline) and the standard deviation of a Raman free, fluorescence only area. This region is taken as the spectrum from 889 $cm^{-1}$ to 942 $cm^{-1}$ (in Raman shift) for Cyclohexane and 1150 $cm^{-1}$ to 1200 $cm^{-1}$ for Sesame oil and Healthy tissue.

Correlation: The fluorescence and Raman spectra should be independent of each other since they follow different generative mechanisms. Therefore, if the two spectra have been separated adequately then we should expect a small correlation between them. The correlation is quantified using Pearson's correlation coefficient.

Sparsity: It is expected that the Raman spectra are moderately sparse, i.e., if the fluorescence has been suppressed adequately then the resulting Raman spectrum should have intermittent sharp peaks. This may be quantified as the proportion (or portion) of wavenumbers with an intensity value less than 0.1% of the maximum intensity value. It will be understood that sparsity may be defined using different measures.

Run-time: The run-time of the algorithm is reported in seconds. Run-time is defined as the time it takes the algorithms to run once for a given parameter setting. However, this does not include the time for the user to adjust parameters which would impact the total implementation time.

Figure 3:
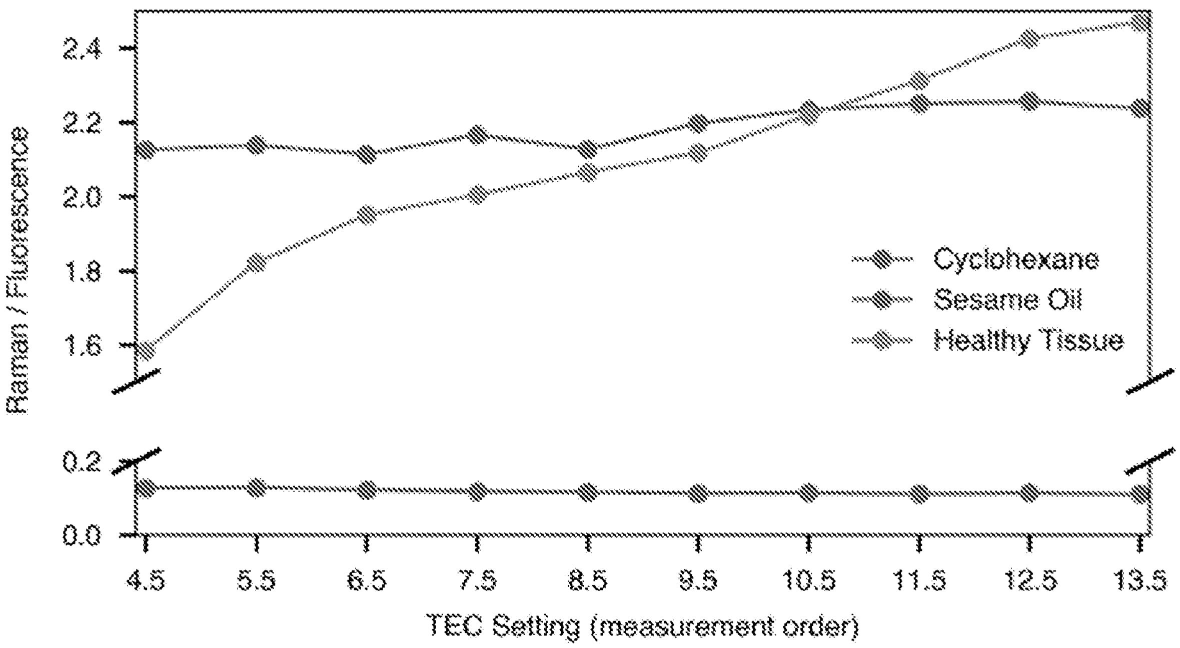
FIG. 3 is a first graph displaying experimental results obtained using embodiments.

Effect of photobleaching: MSERS explicitly captures the effect of photobleaching where the relative intensity of the Raman spectrum compared to the fluorescence background vary over progressive measurements. FIG. 3 is a graph of the relative intensity of Raman spectrum with respect to fluorescence spectrum intensity for MSERS over progressive measurements. On the x-axis is TEC setting. FIG. 3 shows the ratio of Raman and fluorescence intensities, i.e., $(\alpha_k \max_n r_n)/(\beta_k \max_n f_n)$, in the order the measurements were taken for each dataset. An upward trend for Healthy tissue indicating photobleaching is observed while Cyclohexane and Sesame oil do not vary. This is expected for Cyclohexane since it does not have any fluorescence. Sesame oil shows the lowest value indicating relatively high presence of fluorescence compared to Healthy tissue.

Changing number of excitations: Although a higher K is expected to infer better spectra, a lower K may be preferred for in vivo applications to reduce data collection time and motion artefacts, e.g., due to breathing. It was assessed whether fewer measurements can provide adequate accuracy. The performance of MSERS when changing the number of excitations, K was compared. $K\in\{2, 4, 6, 8, 10\}$ was used, where the spectra are chosen to maximize the separation of the excitations.

Figure 4:
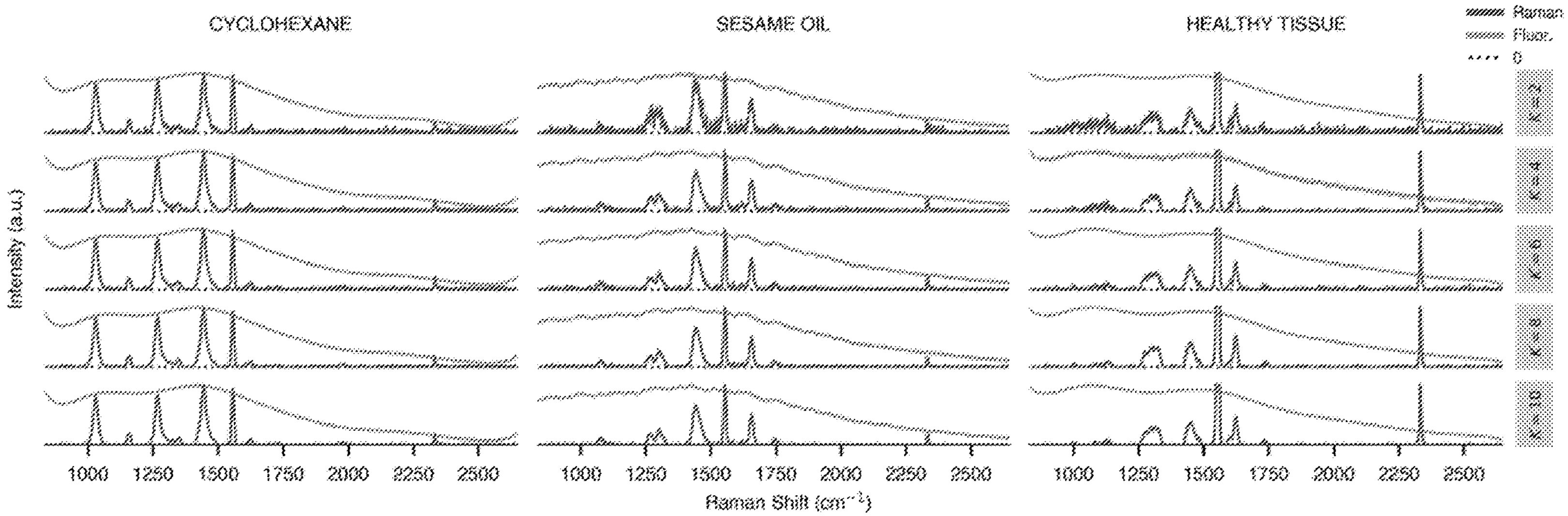
FIG. 4 is a second graph and corresponding table of further experimental results obtained using embodiments.

FIG. 4 shows results in the form a graph and a table. The table provided as part of FIG. 4 summarizes the key metrics for all K, and the graph of FIG. 4 shows the estimated spectra. It is observed that, both qualitatively and quantitatively, the estimated spectra progressively improve in signal-to-noise ratio as well as in precision and recall for increasing K, however, 1) even K=2 provides effective fluorescence suppression, e.g., in Cyclohexane, and 2) K=8 and K=10 provide similar performance in precision and recall for all datasets.

3) Comparison to existing methods: We use K=10 for comparison with other methods. FIG. 5 shows a graph of results of inferred spectra using different algorithms. The Table of FIG. 6 summarizes their characteristics. It is observed that qualitatively MSERS provides a 'peaky'-er Raman spectrum over zero baseline and a smoother background spectrum. This is supported quantitatively by a relatively higher sparsity and SNR compared to other approaches and a relatively more accurate location of the peaks as well as narrow peak widths. It is also observed that 1) AIRPLS provides a relatively noisy Raman spectrum in terms of SNR while RSERDS provides a broader Raman spectrum (see e.g., peaks in Healthy tissue), and both methods result in low precision and recall. 2) PCA works well for Cyclohexane but performs poorly on the other datasets. 3) SICA* provides uncorrelated spectra that can take negative values (see e.g. Healthy tissue). The rest of the methods work well in terms of precision and recall, however, 4) MSERS provides better SNR and sparsity than PIP and SNMF* (see e.g., Sesame oil), and Raman spectrum that is less correlated with the background. (see e.g., Sesame oil).

The embodiments described above may be used for a number of different applications. For example, the apparatus and method described above, may find applications in real-time tumour delineation with the potential to improve surgical resection accuracy and patients outcome in the long term. Biomedical in vivo applications of SER suffers from the presence of tissue background fluorescence and background from Raman fibre that masks the weak Raman peaks of interest. Existing computational tools for suppressing fluorescence are inadequate for such applications due to the low signal-to-noise ratio and photobleaching. The MSERS method described above may be more suitable for such applications. In addition, MSERS may suppresses fluorescence and recovers Raman spectra more effectively than existing approaches, both qualitatively and quantitatively, by capturing the effect of photobleaching, modelling the fluorescence as a smooth spectrum, and modelling the Raman spectrum to be sparse.

The method described in the following estimates the spectra using more than two measurements; estimate the Raman spectrum explicitly rather than the difference spectrum; allows for relative intensities of the fluorescence and Raman to vary to accommodate the effect of photobleaching and variations in the laser output power, and include a bias term to account for additive noise from the sensor (e.g. 'dark current'); use regularization for both Raman and fluorescence spectra to encode their spectral characteristics i.e., Raman spectrum is 'sparse' and fluorescence spectrum is 'smooth', and finally, use shifts reliably estimated from data due to the presence of characteristic oxygen and nitrogen peaks from NCF. In addition, a heuristic approach is provided by for choosing the regularization parameters automatically. MSERS also removes baseline originating from the Raman background of the optical fibre under the assumption that it is sufficiently smooth, and thus, although this background shifts with the excitation, it can be approximated to be fixed as a fluorescence background.

The above description of specific embodiments is made by way of example only and not for the purposes of limitation.

For example, while a combination of TEC and laser is described to provide the shifted excitation wavelength light, it will be understood that, in other embodiments, other hardware arrangements may be provided to generate the shifted wavelength light. In addition, while in the present embodiment, the generated light has up to 10 observed excitation wavelengths, it will be understood that more than 10 wavelengths may be generated in other embodiments.

In addition, the above described methods describe determining a fluorescence and Raman response using characteristics of an expected response. As described above, determining the fluorescence and Raman response involves performing a statistical process (i.e. an iterative process) to determine the responses simultaneously. In some embodiments, the method may comprise applying a machine learning derived process to determine one or more model parameters. In other embodiments, the method may comprise using pre-determined model parameters (i.e. parameters determined using a machine learning derived process) and applying the pre-determined model to the response signals to determine the Raman and fluorescence responses. In such embodiments, the obtained response signals may be provided as an input to a pre-determined model and the pre-determined model may provide, as an output, the fluorescence response and Raman response. The model parameter may include, for the above-described embodiments, the regularization parameters.

The embodiments described above use characteristics of expected fluorescence and Raman responses to the generated shifted excitation light to determine fluorescence and Raman responses. In the above describe embodiment, for the Raman response, such a characteristic relates to sparseness of the expected response. It will be understood that the degree of sparseness of a response signal (for example, as represented by a spectrum over a wavelength range), may be quantified or classified using different methods. In the above described embodiment, the constraint applied to ensure sparseness in the determined Raman response is based on a threshold and compares a fraction of the magnitude of the response signal to a pre-determined threshold. In other embodiments, other measures or quantities derived from the response signal may be used to ensure sparseness. In general, a threshold may be selected based on an expected level of noise, and any value that is lower than that threshold (and non-zero) may be discarded. In other non-limiting example, sparseness may be determined by measuring a standard deviation (or other suitable measure) of a response signal at places where no signal is expected. Further non-limiting methods of determining sparseness (and thus imposing such a constraint on the determined response) is to use, for example, a measure of the entropy of the Raman spectrum, or to minimize the Ip norm, or maximize the kurtosis.

Similar comments apply to the characteristics of an expected fluorescence signal. In the above described embodiments, the characteristics of an expected fluorescence signal corresponds to the smoothness of the response signal (for example, as represented by a spectrum over a wavelength range). It will be understood that the degree of smoothness of a response signal may be quantified using different methods. For example, in the above described method, the constraint used to ensure smoothness in the determined fluorescence response is provided by a regularization term that minimizes a measure of distance between two consecutive values of the Raman response. However, other methods of determining closeness within a neighbourhood of a value may be used.

In a further embodiment, a method for assessing differences between at least two samples, for example, samples from normal and abnormal tissue is provided. The method may include a step of determining that one or more samples is healthy and/or unhealthy based on processing of the response signals. In this embodiment, difference spectra for two samples are determined for Raman and/or fluorescence. It is known to remove respective fluorescence backgrounds separately and then compare the two inferred Raman spectra to observe their differences, for example, to determine or estimate the Raman difference spectrum. In the following, an alternative method for determining a Raman difference spectrum is described. In some embodiments, multiple healthy and/or multiple abnormal samples may be tested.

It will be understood that the method may be used to determine difference between at least two sample/sample portions in which it is known which sample/sample portions are healthy and which are abnormal. Likewise, the method may be used to identify health and/or abnormal samples/sample portions.

In the following described embodiment, a response from at least a first and a second sample portion is determined. It will be understood that the first and second sample portions may be portions of the same sample or may be portions of different samples. The different sample portions may be spatially separated and the method may comprises moving the apparatus or probe between different sample portions to collect data. In the present embodiment, the first sample portions corresponds to healthy or normal tissue and the second sample portion corresponds to unhealthy or abnormal tissue. In some embodiments, one of the sample portions may be tissue of a first subject and the other sample portion is tissue of a second subject.

The difference Raman spectra and/or fluorescence spectra may be used for identifying abnormalities in tissue. In a non-limiting example, the response signals may be processed to identify the presence of a cancerous tissue in the sample.

As described above, the observed spectrum consists of the Raman spectrum which shifts with the shift in excitation, and the fluorescence spectrum which does not change with excitation. As described above, the following representation of the observed spectra is used in the present embodiment:

$$y_k = \alpha_k L^{(\Delta n_k)} r + \beta_k f + b_k$$

where, as described above, $y_k=[y^{(k)}(\tilde{v}_1), \ldots, y^{(k)}(\tilde{v}_N)]^T$ is the column vector of the $k^{th}$ observed spectrum (assuming a noise-less model) $L^{(\Delta n_k)} \in \mathbb{R}^{N\times N}$ is a lower shift matrix that shifts the vector r by $\Delta n_k$ indices i.e.:

$$l_{ij}^{(\Delta n_k)} = \begin{cases} 1 & \text{if } i = j + \Delta n_k \\ 0 & \text{otherwise} \end{cases},$$

And $r \in \mathbb{R}^N$ and $f \in \mathbb{R}^N$ are the vectors of the Raman and fluorescence (or background) spectra, as described above. In addition, α and β denote the intensities of the Raman and fluorescence spectra, respectively (where $\propto_k$ and $\beta_k$ are the relative weights of the latent spectra in the observed spectrum), respectively and b represents a bias term. In this embodiment, $r \in \mathbb{R}^N$ is the Raman spectra corresponding to a healthy tissue. As described above, the Raman background from the fibre may shift with the excitation but may be approximated as fluorescence since it is relatively smooth.

When comparing different tissue types it has been observed that, the respective Raman and fluorescence spectra is different between different tissue types. The resulting observed spectra may be alternatively represented as:

$$y_k = \alpha_k L^{(\Delta n_k)} r + \delta\alpha_k L^{(\Delta n_k)} \delta r + \beta_k f + \delta\beta_k \delta f + b_k$$

where δr and δf are the difference-Raman and difference-fluorescence spectra respectively, and δα and δβ are their corresponding weights.

In the present embodiment, the following constraint is enforced:

$$\delta\alpha_k, \delta\beta_k = \begin{cases} 0 & \text{if normal tissue} \\ \delta\alpha_k, \delta\beta_k & \text{otherwise} \end{cases},$$

In other words, $\delta\alpha_k$ and $\delta\beta_p$ are 0 for normal tissue under the assumption that the abnormal tissue response comprises the normal response and a difference response. In this embodiment, r, f are positive while δr and δf may take negative values.

The coefficients can be found by minimizing the mean square loss function for the above representation:

$$c = \sum_{k=1}^{K} \left\| y_k - \left(\alpha_k L^{(\Delta n_k)} r + \delta\alpha_k L^{(\Delta n_k)} \delta r + \beta_k f + \delta\beta_k \delta f + b_k\right)\right\|^2 + \lambda_f f^T \tilde{K} f + \lambda_r \|r\|_1$$

In this embodiment, as described above, the regularizations encodes the knowledge that a fluorescence response is smooth while the Raman response is 'sparse'.

A number of different numerical procedures may be used to solve the above optimisation problem. As a first example, a numerical procedure to find $\alpha_k$, $\beta_k$, $\delta\alpha_k$, $\gamma\beta_k$, $b_k$ given f, r, δf, δr for k=1, . . . , K. This is a standard nonnegative least squares problem:

$$\min_{x\geq 0} \|y_k - Cx\|^2$$

with $C=[L^{(\Delta n_k)}r, L^{(\Delta n_k)}\delta r, f, \delta f, 1]$ and $x=[\alpha_k, \delta\alpha_k, \beta_k, \delta\beta_k, b_k]^T$ As a second example, a numerical procedure to find f given oc, f, 6*a*, Sf, b given r, Sr, 6*f* may be used. This is a standard nonnegative least squares problem. Let $$y_k^f = y - \left(\alpha_k L^{(\Delta n_k)} r + \delta\alpha_k L^{(\Delta n_k)} \delta r + \beta_k \delta f + b_k\right)$$

Then the following is solved:

$$\min_{f\geq 0} \sum_{k=1}^{K} \left\| y_k^f - \beta_k f\right\|^2 + \lambda_f f^T \tilde{K} f \equiv$$

-continued $$\min_{f\geq 0} f^T\left[\left(\sum_{k=1}^{K}\beta_k^2\right)I+\lambda_f\tilde{K}\right]f-2\left[\sum_{k=1}^{K}\beta_k y_k^r\right]^T f$$

As a third example, a numerical procedure to find r given ∝, β, δα, δβ, b given f, δr, δf may be used. This is a standard nonnegative LASSO problem. Let $$y_k^r = y_k - \left(\delta\alpha_k L^{(\Delta n_k)}\delta r + \beta_k f + \delta\beta_k \delta f + b_k\right)$$

$$\min_{r\geq 0}\sum_{k=1}^{K}\left\|y_k^r - \alpha_k L^{(\Delta n_k)} r\right\|^2 \lambda_r \|r\|_1 \equiv$$

$$\min_{r\geq 0} r^T\left[\left(\sum_{k=1}^{K}\beta_k^2\right)\right]-2\left[\sum_{k=1}^{K}\alpha_k y_k^{f^T} L^{(\Delta n_k)}\right]r+\lambda_r\|r\|_1$$

then the following is solved:

As a fourth example, a numerical procedure to find δf given ∝, β, γ, b given r, f, or δr may be used. This is standard least squared problem. Letting $$y_k^{\delta f} = y_k - \left(\alpha_k L^{(\Delta n_k)} r + \delta\alpha_k L^{(\Delta n_k)}\delta r + \beta_k f + b_k\right)$$

the following is solved:

$$\min\sum_{k=1}^{K}\left\|y_k^{\delta f} - \delta\beta_k \delta f\right\|^2 + \lambda_{\delta f}\delta f^T \tilde{K}\delta f \equiv$$

$$\min \delta f^T\left[\left(\sum_{k=1}^{K}\delta\beta_k^2\right)I+\lambda_{\delta f}\tilde{K}\right]\delta f-2\left[\sum_{k=1}^{K}\delta\beta_k y_k^{\delta f}\right]^T\delta f$$

As a fifth example, a numerical procedure to find δr given ∝, β, γ, b given r, f, δf may be used. This is standard least squared problem. Letting $$y_k^{\delta r} = y_k - \left(\alpha_k L^{(\Delta n_k)} r + \beta_k f + \delta\beta_k \delta f + b_k\right)$$

the following is solved:

$$\min\sum_{k=1}^{K}\left\|y_k^{\delta r} - \delta\alpha_k L^{(\Delta n_k)}\delta r\right\|^2 \equiv$$

$$\min \delta r^T\left[\left(\sum_{k=1}^{K}\delta\alpha_k^2\right)I\right]\delta r-2\left[\sum_{k=1}^{K}\delta\alpha_k y_k^{\delta r^T} L^{(\Delta n_k)}\right]^T\delta r$$

In the previously described embodiment, it was described that the difference Raman spectra and/or fluorescence spectra may be used for diagnosis or identifying abnormalities in tissue. In some further embodiments, the method comprises performing a comparison of the determined Raman spectra to a signature representing a specific tissue abnormality or other disease. For example, certain types of cancer may have corresponding Raman spectra and the method includes the step of comparing the determined Raman spectra to the abnormal spectra. Such a comparison may include comparing peaks or other properties of the Raman spectra.

In a further embodiment, the method includes determining an uncertainty in the estimated Raman and fluorescence spectra. A determined uncertainty may be used to determine whether a peak is noise or a signal. It may be determined that a Bayesian approach to capture the uncertainty may be used, in an example embodiment. In a non-limiting example, the following model is used:

$\lambda_r \sim \text{Gamma}(\alpha_r, \beta_r)$ $r \sim \text{Exp}(\lambda_r)$ $\mu_f \sim \mathcal{U}[0, \infty]$ $\lambda_f \sim \text{Gamma}(\alpha_f, \beta_f)$ $\ell \sim p(\bullet)$ $f \sim \mathcal{TN}(\mu_f, 1, \lambda_f K \ell)$ $\mu_b \sim \mathcal{U}[0, \infty]$ $\lambda^f \sim \text{Gamma}(\alpha_b, \beta_b)$ $b_k \sim \mathcal{N}(\mu_b, \lambda_b)$ $\mu_\alpha \sim \mathcal{U}[0, \infty]$ $\lambda_\alpha \sim \text{Gamma}(\alpha_\alpha, \beta_\alpha)$ $b_k \sim \mathcal{N}(\mu_b, \lambda_b)$ $\alpha_k \sim \mathcal{U}[0, \infty]$ $\lambda_\beta \sim \text{Gamma}(\alpha_\beta, \beta_\beta)$ $\beta_k \sim \mathcal{N}(\mu_\beta, \lambda_\beta)$ $\lambda_{\mathcal{Y}} \sim \text{Gamma}(\alpha_{\mathcal{Y}}, \beta_{\mathcal{Y}})$ $$\mu_k = \alpha_k L^{(\Delta n_k)} r + \beta_k f + b_k$$

$y_k \sim \mathcal{N}(\mu_k, \lambda_y)$

For reference, the distributions above are as shown in Table 2:

TABLE 2

| Name | Notation | Density |
|---|---|---|
| Normal | $\mathcal{N}(x\|\mu, \tau^{-1})$ | $\frac{r^{1/2}}{(2\pi)^{1/2}}\exp\left(-\left(\tau(x-\mu)^2\right)/2\right)$ |
| Multivariate normal | $\mathcal{N}(x\|\mu, \tau^{-1})$ | $\frac{\det(\tau)^{1/2}}{(2\pi)^{y/2}}\exp\left(-\left((x-\mu)^T\tau(x-\mu)\right)/2\right.$ |
| Exponential | $\text{Exp}(x\|\lambda_r)$ | $\lambda\exp(\tau(-\lambda x))1(x \geq 0)$ |
| Gamma | $\text{Gamma}(x\|\alpha, \beta)$ | $\frac{\beta^\alpha}{\Gamma(\alpha)}x^{\alpha-1}\exp(-\beta x)$ |

As a non-limiting example, a Gibbs sampler and variational Bayes' approach can be used to approximate the posterior.

$$r_i \sim \text{Exp}(\lambda_{r,i}^*)$$

$$f_i \sim \mathcal{TN}(\mu_{f,i}^*, \sigma_{f,i}^{2*})$$

$$\alpha_k \sim \mathcal{TN}(\mu_{\alpha,k}^*, \sigma_{\alpha,k}^{2*})$$

$$\beta_k \sim \mathcal{TN}(\mu_{\beta,k}^*, \sigma_{\beta,k}^{2})$$

$$b_k \sim \mathcal{TN}(\mu_{b,j}^*, \sigma_{b,k}^{2*})$$

$$\mu_f \sim \mathcal{TN}(\mu_f^*, \tau_f^{-1*})$$

$$\mu_b \sim \mathcal{TN}(\mu_b^*, \tau_f^{-1*})$$

$$\mu_\alpha \sim \mathcal{TN}(\mu_\alpha^*, \tau_\alpha^{-1*})$$

$$\mu_\beta \sim \mathcal{TN}(\mu_\beta^*, \tau_\beta^{-1*})$$

$$\tau_y \sim \text{Gamma}(\alpha_y^*, \beta_y^*)$$

$$\tau_f \sim \text{Gamma}(\alpha_f^*, \beta_f^*)$$

-continued $$\lambda_r \sim \text{Gamma}(\alpha_r^*, \beta_r^*)$$

$$\tau_\alpha \sim \text{Gamma}(\alpha_\beta^*, \beta_\alpha^*)$$

$$\tau_\beta \sim \text{Gamma}(\alpha_\beta^*, \beta_\beta^*)$$

$$\tau_b \sim \text{Gamma}(\alpha_b^*, \beta_b^*)$$

In such embodiments, the uncertainty associated with the determined Raman and/or fluorescence response is determined. As the uncertainty associated with a signal and background will have different characteristics, the determined uncertainty may be used to identify a portion of the determined response as either signal and/or background. In some embodiments, uncertainty can be quantified using the Cramer Rao bound.

In a further embodiment, a confirmatory analysis is performed. In such an embodiment, it is assumed that the Raman signal, for example, the peak, is not known to us. However, if it assumed that the shape of the spectrum is known to us to some extent then this information can be used to subtract the background. This is a confirmatory analysis and may be done in the same framework as described above. However, the current framework will require that r is known exactly. The framework may be extended, in some embodiments, to find r that is sufficiently similar to a known ground truth. In such an analysis, an r can be found that is sufficiently similar to a known ground truth, i.e., $\text{sim}(r, r_{truth}) \cdot r_{truth}$, for example, may hold information on where the Raman peaks are expected. In such embodiments, pre-determined information relating to one or more characteristics of the expected response is used when determining the Raman and/or fluorescence response. As a non-limiting example, response spectra shape information or peak location information may be used.

In a further embodiment, a deconvolution process is performed on the determined response. This may lead to a sharpened peak of the Raman spectra. The Raman peaks estimated from data are often broad. However, in some circumstances, it is expected that Raman peaks are narrow in nature and that this 'broadening' of the peak can be a result of frequency leakage. Assuming that the leakage can be measured, the estimated signal can be described as a convolution of the underlying true Raman signal with narrower peaks and a finite length filter, i.e., $$r = r_{truth} * h$$

In such embodiments, the deconvolution process is performed using a reference function, in this example, a finite length filter.

Figures 7A, 7B:
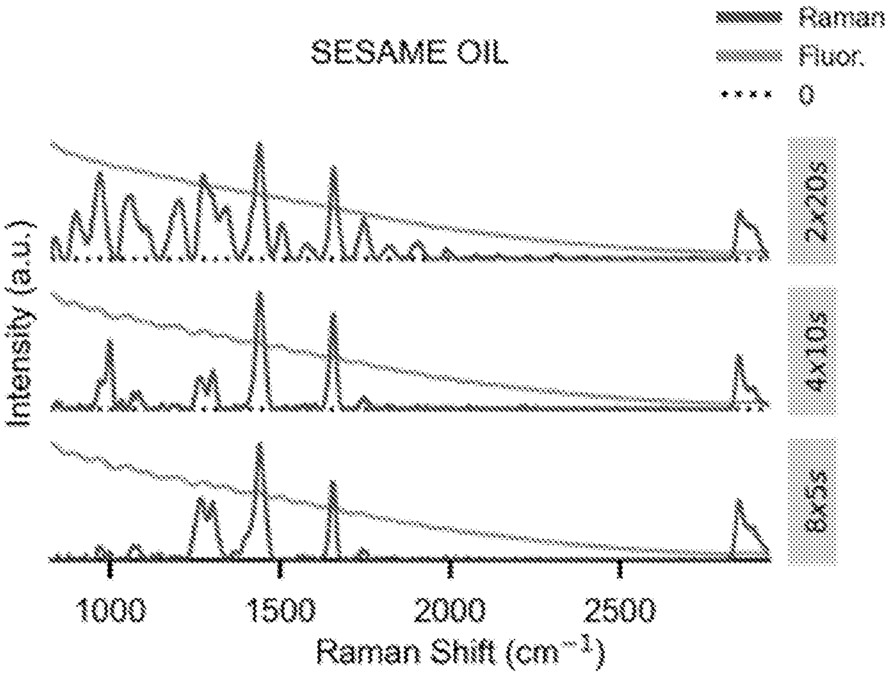
FIG. 7(*a*) is a further graph of further experimental results and FIG. 7(*b*) is a further table of further experimental results.

FIG. 7(*a*) is a graph of further experimental results. For these results, sesame oil spectra were measured. The figure shows the inferred Raman and fluorescence spectra. From MSERS for different number of excitations but matching acquisition time. In this plot, a.u. is arbitrary unit. Eight different excitations were applied using the DBR laser. The output power from the fibre probe was 14.5 mW. Three different cases were compared with matching total acquisition time of 40 s: using eight shifted excitations of 5 s integration time, four shifted excitations of 10 s integration time, and two shifted excitations of 20 s. The shift between excitations were determined by dipping the fibre probe in ethanol for each excitation and using the strongest ethanol peak and its known Raman shift of 883 $cm^{-1}$ as a reference. The Raman shift of sesame oil peaks to be identified are: 1083, 1267, 1304, 1441, 1657, 1747, 2850, and 2897 $cm^{-1}$.

FIG. 7(*b*) is a table summarizing the characteristics of spectra inferred from data set IV using MSERS for different number of excitations K. ↓(↑) implies that lower (higher) value is better. Run-time is shown in seconds. #P is number of detected peaks. The results suggest that, in some circumstances, for a given total acquisition time it may be preferable to use a higher number of shifted excitation with shorter integration time.

It will be clear to the skilled person that modifications of detail may be made within the scope of the invention.

The invention claimed is:

1. A method of performing Raman spectroscopy comprising:

generating wavelength shifted excitation light for exciting a Raman response from at least one sample, wherein the wavelength shifted excitation light comprises at least two excitation wavelengths;

providing the wavelength shifted excitation light to the at least one sample and collecting signal light from the at least one sample;

obtaining response signals from the collected signal light;

processing the obtained response signals to determine a Raman response and a fluorescence response, wherein determining the Raman response uses at least one characteristic of an expected Raman response to the wavelength shifted excitation light and wherein determining the fluorescence response uses at least one characteristic of an expected fluorescence response to the shifted excitation light, and wherein determining the Raman response comprises performing a model fitting process comprising determining a set of model parameters to minimize a loss function, wherein a value of the loss function is dependent on an estimated Raman response and an estimated fluorescence response.

2. The method according to claim 1, wherein the at least one characteristic of the expected Raman response comprises a sparseness of the expected Raman response and wherein the at least one characteristic of the expected fluorescence response comprises a smoothness of the expected fluorescence response.

3. The method according to claim 1, wherein the at least one characteristic of the expected Raman response comprises a substantial portion of the Raman response having a measure of size, amplitude and/or intensity lower than a pre-determined threshold.

4. The method according to a claim 1, wherein the at least one characteristic of the expected Raman response comprises a response having a set of known peaks.

5. The method according to claim 1, wherein the at least one characteristic of the expected fluorescence response comprises a change less than a pre-determined value over a neighbourhood of a wavelength.

6. The method according to claim 1, wherein determining the fluorescence and Raman response comprises processing the obtained response signals subject to a first constraint or condition based on the characteristics of the expected Raman response and subject to a second constraint or condition based on the characteristics of the expected fluorescence response.

7. The method according to claim 6, wherein at least one of a), b), c):

a) the first constraint or condition causes the determined Raman response to be modelled as a sparse signal and wherein the second constraint or condition causes the determined fluorescence response to be modelled as a smooth signal;

b) the first constraint or condition is applied by minimizing a measure of the size of the Raman response;

c) the second constraint or condition is applied by minimizing a measure of the variability of the fluorescence response.

8. The method of claim 6, wherein the effect of the first and second constraints on the determined responses are controlled by respective first and second regularization parameters and wherein the method further comprises repeating the processing of the obtained response signals for different values of the first and second regularization parameters thereby to determine a plurality of Raman and fluorescence responses.

9. The method of claim 8 further comprising performing a selection process on the plurality of determined responses and selecting a desired Raman response and a desired fluorescence response in accordance with a predetermined set of selection rules thereby to select on one of the plurality of determined responses.

10. The method of claim 9, wherein the set of selection rules are based on at least one of:

a comparison between the degrees to which the determined Raman and/or fluorescence responses exhibit desired characteristics of the expected Raman and/or fluorescence response;

a comparison of a measure similarity between the determined Raman and fluorescence response for each set of parameters.

11. The method according to claim 1, wherein processing the obtained response signals comprises determining at least one property of a Raman response spectrum and at least one property of a fluorescence response spectrum, wherein at least one of a) and b):

a) the at least one property of the Raman response spectrum comprises at least one property of one or more peaks, for example, size and/or wavelength of a peak and/or number of peaks;

b) the at least one property of the fluorescence response spectrum comprises at least one of: the size and shape of a smooth fluorescence background, the degree of smoothness of the fluorescence response spectrum.

12. The method according to claim 1, wherein at least one of a), b), c):

a) generating the shifted excitation light comprises varying a temperature of a light source;

b) the method further comprises determining or estimating the wavelengths of the wavelength shifted light or the shift in wavelength of the wavelength shifted light and using the determined or estimated wavelengths or shifts in wavelength to determine the Raman and fluorescence response;

c) the fluorescence and Raman responses are determined simultaneously.

13. The method of claim 1, wherein the shifted excitation light is provided to a first sample portion and a second sample portion, wherein the method further comprises collecting the signal light from the first and second sample portions.

14. The method of claim 13, wherein at least one of a), b), c):

a) the first sample portion is at a first position and the second sample portion is at a second position and the method comprises providing shifted excitation light to and collected signal light from the first and second positions;

b) the determined Raman response comprises a difference between the Raman response from a first sample portion and a second sample portion and/or wherein the determined fluorescence response comprises a differences between the fluorescence response from the first sample portion and the second sample portion;

c) the first sample portion comprises a healthy tissue sample and the second sample comprises an unhealthy tissue sample.

15. The method of claim 1, wherein the method further comprises at least one of a), b), c), d):

a) further processing the response signals to determine that the at least one sample is healthy and/or unhealthy;

b) determining the Raman response further uses further pre-determined information for an expected response, for example, peak location information;

c) determining an uncertainty associated with the determined Raman and/or fluorescence response, optionally using the determined uncertainty to identify a portion of the determined response as signal and/or background;

d) performing a deconvolution process on the determined response.

16. A method of performing Raman spectroscopy comprising:

generating wavelength shifted excitation light for exciting a Raman response from at least one sample, wherein the wavelength shifted excitation light comprises at least two excitation wavelengths;

providing the wavelength shifted excitation light to the at least one sample and collecting signal light from the at least one sample;

obtaining response signals from the collected signal light, wherein obtaining the response signals from the collected signal light comprises performing a plurality of measurements corresponding to a plurality of excitation wavelengths;

processing the obtained response signals to determine a Raman response and a fluorescence response, wherein determining the Raman response uses at least one characteristic of an expected Raman response to the wavelength shifted excitation light and wherein determining the fluorescence response uses at least one characteristic of an expected fluorescence response to the shifted excitation light, and wherein processing the obtained response signals comprises applying a model that permits changes in the intensity of the Raman response and/or the fluorescence response over the plurality of measurements.

17. A method of performing Raman spectroscopy comprising:

generating wavelength shifted excitation light for exciting a Raman response from at least one sample, wherein the wavelength shifted excitation light comprises at least two excitation wavelengths;

providing the wavelength shifted excitation light to the at least one sample and collecting signal light from the at least one sample;

obtaining response signals from the collected signal light;

processing the obtained response signals to determine a Raman response and a fluorescence response, wherein determining the Raman response uses at least one characteristic of an expected Raman response to the wavelength shifted excitation light and wherein determining the fluorescence response uses at least one characteristic of an expected fluorescence response to the shifted excitation light, and wherein processing the obtained response signals comprises at least one of a), b:

a) modelling a bias parameter representative of additive noise from the sensor;

b) applying a further constraint to ensure that the determined Raman response is non-negative.

18. A Raman spectroscopy apparatus comprising:

a shifted wavelength excitation light generator configured to generate shifted wavelength excitation light having at least two excitation wavelengths, wherein the generated shifted wavelength excitation light is for exciting a Raman response in at least one sample;

a delivery path configured to deliver the generated shifted wavelength excitation light to the at least one sample;

a collection path configured to collect signal light from the at least one sample;

a response measurement device for obtaining response signals from the collected signal light; and a processing resource configured to process the obtained response signals to determine a Raman response and a fluorescence response, wherein determining the Raman response uses at least one characteristic of an expected Raman response to the wavelength shifted excitation light and wherein determining the fluorescence response uses at least one characteristic of an expected fluorescence response to the shifted excitation light, wherein the processing resource is configured to determine the Raman response by performing a model fitting process comprising determining a set of model parameters to minimize a loss function, wherein a value of the loss function is dependent on an estimated Raman response and an estimated fluorescence response.

19. A computer-implemented method comprising:

processing obtained response signals to determine a Raman response and a fluorescence response, wherein the obtained response signals are representative of a response to wavelength shifted excitation light of at least one sample and wherein determining the Raman response uses at least one characteristic of an expected Raman response to the wavelength shifted excitation light and wherein determining the fluorescence response uses at least one characteristic of an expected fluorescence response to the shifted excitation light, and wherein determining the Raman response comprises performing a model fitting process comprising determining a set of model parameters to minimize a loss function, wherein a value of the loss function is dependent on an estimated Raman response and an estimated fluorescence response.

* * * * *